US009769230B2

(12) United States Patent
Hannuksela

(10) Patent No.: US 9,769,230 B2
(45) Date of Patent: Sep. 19, 2017

(54) MEDIA STREAMING APPARATUS

(75) Inventor: Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1218 days.

(21) Appl. No.: 13/810,876

(22) PCT Filed: Jul. 20, 2010

(86) PCT No.: PCT/IB2010/053309

§ 371 (c)(1),
(2), (4) Date: Mar. 28, 2013

(87) PCT Pub. No.: WO2012/010928

PCT Pub. Date: Jan. 26, 2012

(65) Prior Publication Data

US 2013/0191550 A1    Jul. 25, 2013

(51) Int. Cl.
*H04L 29/06* (2006.01)
*H04N 21/2343* (2011.01)
*H04N 21/24* (2011.01)
*H04N 21/6336* (2011.01)
*H04N 21/643* (2011.01)
*H04N 21/845* (2011.01)
*H04N 21/854* (2011.01)
*H04N 19/70* (2014.01)
(Continued)

(52) U.S. Cl.
CPC ............ *H04L 65/60* (2013.01); *H04N 19/31* (2014.11); *H04N 19/46* (2014.11); *H04N 19/70* (2014.11); *H04N 21/234327* (2013.01); *H04N 21/2402* (2013.01); *H04N 21/6336* (2013.01); *H04N 21/64322* (2013.01); *H04N 21/8455* (2013.01); *H04N 21/85406* (2013.01); *H04N 21/8456* (2013.01)

(58) Field of Classification Search
None
See application file for complete search history.

(56) References Cited

U.S. PATENT DOCUMENTS 9,049,456 B2 *   6/2015   Wang
9,635,396 B2 *   4/2017   Wang ................. H04N 21/2662
(Continued)

FOREIGN PATENT DOCUMENTS

CN      101459847 A1      6/2009
WO      WO-2011/159605 A1 12/2011

OTHER PUBLICATIONS

Written Opinion for Application No. PCT/IB2010/053309 dated May 12, 2011.
(Continued)

*Primary Examiner* — Mohammad J Rahman
(74) *Attorney, Agent, or Firm* — Alston & Bird LLP

(57) ABSTRACT

An apparatus comprising at least one processor and at least one memory including computer program code the at least one memory and the computer program code configured to, with the at least one processor, cause the apparatus at least to perform: determining at least a first signal and an associated second signal; storing the first signal in a first file; generating in the first file and associated with the first signal a reference pointer to a location; and storing at the location indicated by the reference pointer the second signal associated with the first signal.

22 Claims, 14 Drawing Sheets

(51) Int. Cl.
H04N 19/46 (2014.01)
H04N 19/31 (2014.01)

(56) References Cited

U.S. PATENT DOCUMENTS

| | | | |
|---|---|---|---|
| 2005/0207442 A1* | 9/2005 | Zoest | G11B 20/00086 370/465 |
| 2006/0129909 A1* | 6/2006 | Butt | G11B 20/10 715/201 |
| 2006/0136457 A1 | 6/2006 | Park et al. | |
| 2006/0153300 A1* | 7/2006 | Wang | H04N 19/56 375/240.16 |
| 2006/0251169 A1* | 11/2006 | Wang | H04N 19/105 375/240.12 |
| 2007/0022215 A1 | 1/2007 | Singer et al. | |
| 2007/0110150 A1* | 5/2007 | Wang | H04N 21/234327 375/240.1 |
| 2007/0183494 A1* | 8/2007 | Hannuksela | H04N 21/234327 375/240.1 |
| 2007/0230564 A1* | 10/2007 | Chen | H04N 21/234327 375/240.01 |
| 2008/0013623 A1* | 1/2008 | Wang | H04N 21/2383 375/240.1 |
| 2008/0095228 A1* | 4/2008 | Hannuksela | H04N 19/70 375/240.01 |
| 2009/0154567 A1 | 6/2009 | Lei et al. | |
| 2011/0064146 A1* | 3/2011 | Chen | H04N 21/234327 375/240.26 |
| 2014/0254681 A1* | 9/2014 | Aminlou | H04N 19/105 375/240.16 |

OTHER PUBLICATIONS

Grüneberg, K., et al.; "*Deliverable D3.2 MVC/SVC storage format;*" Information and Communication Technologies (ICT) Programme, Project N°: FP7-ICT-214063 SEA; dated Jan. 29, 2009.

"3GPP TS 26.cde V0.0.3—3$^{rd}$ Generations Partnership Project, Technical Specification Group Services and System Aspects Transparanet end-to-end Packet-switched Streaming Service (PSS), HTTP-based Streaming and Download (HSD) (Release 10);" 3GPP; pp. 1-34; dated Jun. 2010.

Extended European Search Report for Application No. 10854980.9; dated Dec. 16, 2013.

Office Action for Chinese Application No. 201080069167.3 dated May 14, 2015.

Office Action for Chinese Application No. 201080069167.3 dated Oct. 13, 2015.

Office Action from corresponding Chinese Patent Application No. 201080069167.3 dated Jun. 3, 2016.

JVT-U201, "Joint Draft 8 of SVC Amendment", 21st JVT meeting, Hangzhou, China, Oct. 20-27, 2006, available from http://ftp3.itu.ch/av-arch/jvt-site/2006_10_Hangzhou/JVT-U201.zip.

Nikolaus Färber, Stefan Döhla, and Jochen Issing, "Adaptive progressive download based on the MPEG-4 file format," Journal of Zhejiang University Science A, 2006 vol. 7(Suppl. I), pp. 106-111.

Alex Zambelli, "IIS Smooth Streaming Technical Overview," Microsoft Corporation; Mar. 2009; 17 pages.

Live Video Streaming Online, Adobe HTTP Dynamic Streaming [online] [retrieved Jan. 27, 2017]. Retrieved from the Internet: <URL: http://www.adobe.com/products/httpdynamicstreaming/>. 3 pages.

HTTP Live Streaming Overview—Introduction [online] [retrieved Jan. 27, 2017]. Retrieved from the Internet: <URL:http://developer.apple.com/iphone/library/documentation/networkinginternet/conceptual/streamingmediaguide/Introduction/Introduction.html#//apple_ref/doc/uid/TP40008332-CH1-DontLinkElementID_29>. 3 pages.

HTTP Live Streaming [online] [retrieved Jan. 27, 2017]. Retrieved from the Internet: <URL:http://tools.ietf.org/html/draft-pantos-http-live-streaming-03>. (dated Apr. 2, 2010) 23 pages.

Office Action from corresponding European Patent Application No. 10854980.9 dated Aug. 5, 2015.

Office Action from corresponding European Patent Application No. 10854980.9 dated Apr. 18, 2016.

3GPP TS 26.234 V9.3.0 (Jun. 2010); 3rd Generation Partnership Project; Technical Specification Group Services and System Aspects; Transparent end-to-end Packet-Switched Streaming Service (PSS); Protocols and codecs (Release 9); 182 pages.

IIS Smooth Streaming Transport Protocol [online] [retrieved Jan. 27, 2017]. Retrieved from the Internet: <URL:https://wikileaks.org/sony/docs/05/docs/DECE/TWG/IIS%20Smooth%20Streaming.pdf>. (dated Sep. 8, 2009) 55 pages.

International Search Report for Application No. PCT/IB2010/053309 dated May 12, 2011.

Amon, P. et al., *File Format for Scalable Video Coding*, IEEE Transactions on Circuits and Systems for Video Technology, vol. 17, No. 9 (Sep. 1, 2007), pp. 174-185.

\* cited by examiner

MEDIA STREAMING APPARATUS

The present invention relates to media streaming apparatus and methods, and in particular, but not exclusively to progressive media streaming apparatus and methods.

BACKGROUND

Streaming media are multimedia that are constantly received by, and normally presented to, an end-user or client while being delivered by a streaming provider or server. Streaming media systems can for example be implemented over telecommunications networks for example using a telecommunications system to stream Internet television.

A development of media streaming is progressive download. Progressive download is a term used to describe the transfer of digital media files from a server to a client, typically using the HTTP protocol, when initiated from a computer. The client or consumer using progressive download can begin playback of the media before the download is completed. The key difference between streaming media and progressive download is in how the digital media data is received and stored by the client or end user device that is accessing the digital media.

A client media player that is capable of progressive download playback relies on meta data located in the header of the file to be intact and a local buffer of the digital media file as it is downloaded from a web server. At the point in which a certain amount of data becomes available to the local playback device, the media player can begin to play the media. This certain amount of buffered data can, for example, be estimated based on the reception bitrate and the bitrate at which media has been encoded into the file. Alternatively, this certain amount of buffer can be embedded into the file by the producer of the content in the encoder settings assuming that a certain reception bitrate is met or exceeded.

The end user experience is similar to streaming media, however the digital file is typically downloaded to a physical drive on the end user's device. For example the digital file is typically stored in the temporary folder of the associated web browser if the digital media was embedded into a web page or to a storage directory that is set in the preferences of the media player used for playback. The digital media file can stutter or stop play back if the rate of play back exceeds the rate at which the file is downloaded. The file can then begin to play again after further download.

The metadata as well as media data in the files intended for progressive download are interleaved in such a manner that media data of different streams is interleaved in the file and the streams are synchronized approximately. Furthermore, metadata is often interleaved with media data so that the initial buffering delay required for receiving the metadata located at the beginning of the file is reduced. An example how the ISO Base Media File Format and its derivative formats can be restricted to be progressively downloadable can be found in the progressive download profile of the 3GPP file format.

However there are several problems associated with conventional progressive downloading.

Firstly conventional progressive downloading clients cannot efficiently play a file having single metadata file for all versions and all the media data in the same file, because the file bitrate is typically excessive compared to the available network throughput. If the media data resides in separate files compared to the metadata, the overhead of receiving the metadata for all versions delays the start of the playback and may cause interruptions and additional buffering during the playback. Moreover, the received metadata file contains references to such versions of the media content that has not been received—hence, the metadata file is not fully compliant.

Secondly the metadata and respective media data of each fragment covering a certain playback range of a presentation and each version (bitrate) of the content resides in their own file. Such chunking of the content to a large set of small files is used in a possible realization of static HTTP streaming. For example, chunking of a content file of duration 20 minutes and with 10 possible representations (5 video bitrates and 2 audio languages) into small content pieces of 1 second, would result in 12000 small files. This constitutes a burden on web servers, which has to deal with such a large amount of small files.

Thirdly conventional progressive downloading clients cannot play files, when one file contains only a fragment.

Fourthly a regular web server operationally connected with a dynamic streaming server executing a command through CGI generally means the invocation of a newly created process. Starting up the process can take up much more time and memory than the actual work of generating the output, especially when the program still needs to be interpreted or compiled. If the command is called often, the resulting workload can quickly overwhelm the web server.

The overhead involved in interpretation can be reduced by using compiled CGI programs, such as those in C/C++, rather than using Perl or other scripting languages. The overhead involved in process creation can be reduced by solutions such as FastCGI, or by running the application code entirely within the webserver using special extension modules. The popular Web servers developed their own extension mechanisms that allow third-party software to run inside the web server itself, e.g. Apache modules, Netscape NSAPI plug-ins, IIS ISAPI plug-ins. However, the use of readily complied CGI programs or a dedicated extension to a web server makes the streaming server solution platform-specific and hence harder to port to another web server and/or operating system platform.

Fifthly current dynamic HTTP streaming servers are specific to a platform and hence harder to port to another operating system platform. The HTTP server protocol stack has to be implemented and the well-tested, scalable, and robust web servers cannot be used.

Furthermore if the server is state-keeping, then its computational complexity is higher than that of a stateless server.

Sixthly with respect to the transport file format currently used the transmitted files are similar to files formatted according to an existing file format used for file playback but current file players cannot be used to play the transport files. The transport file(s) have to be converted to an existing file format used for file playback in the receiving end if they are intended for file playback. The conversion process can be problematic and may not be straightforward.

SUMMARY OF THE APPLICATION

This application proceeds from the consideration that the currently proposed streaming systems are inflexible.

Embodiments of the present application aim to address the above problem.

There is provided according to a first aspect a method comprising: determining at least a first signal and an associated second signal; storing the first signal in a first file; generating in the first file and associated with the first signal a reference pointer to a location; and storing at the location indicated by the reference pointer the second signal associated with the first signal.

The first signal may be configured to be decodable independent of the second signal.

The first signal may be a base media representation and the second signal may be an enhanced media representation associated with the base media representation.

The enhanced media representation may be at least one of: a temporal resolution enhanced media representation; a greater number of views enhanced media representation; a spatial resolution enhanced media representation; and a quality enhanced media representation.

The location may comprise a location in a further file, wherein the reference pointer comprises a conditional extraction unit.

The location may comprise a location in the first file, wherein the reference pointer may comprise an extraction unit.

The method may further comprise generating at the location indicated by the reference pointer a further reference pointer to the first signal in the first file location.

The further reference pointer may comprise an extraction unit.

The method may further comprise storing in the first file metadata associated with the first signal and the second signal.

The method may further comprise storing in a further file metadata associated with the first signal and the second signal, wherein the metadata may comprise a pointer to the location of the first signal and the second signal.

The method may further comprise: determining a bandwidth of a network; and transmitting the first signal and at least a subset of the second signal over the network.

The method may further comprise: generating a patching indicator configured to indicate to a decoder to concatenate the first signal and the second signal.

The method may further comprise: generating a patching indicator configured to indicate to a receiver to concatenate the first signal and the second signal.

The method may further comprise: generating a patching indicator configured to indicate to a file parser to concatenate the first signal and the second signal.

According to a second aspect there is provided a method comprising: receiving at least a first file comprising a first signal and a reference pointer to a location; generating at least a first playable signal based on the first signal.

The first signal may comprise a base media representation.

The method may further comprise: determining the content of the location comprises a second signal, the second signal may comprise an enhanced media representation; and generating the first playable signal based on the first signal and the second signal.

The enhanced media representation may be at least one of: a temporal resolution enhanced media representation; a greater number of views enhanced media representation; a spatial resolution enhanced media representation; and a quality enhanced media representation.

The location may comprise a location in a further file, wherein the reference pointer may comprise a conditional extraction unit.

The location may comprise a location in the first file, wherein the reference pointer may comprise an extraction unit.

The method may further comprise determining at the location indicated by the reference pointer a further reference pointer to the first signal in the first file location.

The further reference pointer may comprise an extraction unit.

The method may further comprise determining in the first file metadata associated with at least the first signal.

The method may further comprise determining in a further file metadata associated with the first signal wherein the metadata may comprise a pointer to the location of the first signal.

The method may further comprise: determining a bandwidth of a network; determining at least a subset of the second signal; and requesting the first signal and the at least a subset of the second signal over the network.

According to a third aspect there is provided an apparatus comprising at least one processor and at least one memory including computer program code the at least one memory and the computer program code configured to, with the at least one processor, cause the apparatus at least to perform: determining at least a first signal and an associated second signal; storing the first signal in a first file; generating in the first file and associated with the first signal a reference pointer to a location; and storing at the location indicated by the reference pointer the second signal associated with the first signal.

The first signal may be configured to be decodable independent of the second signal.

The first signal may be a base media representation and the second signal may be an enhanced media representation associated with the base media representation.

The enhanced media representation may be at least one of: a temporal resolution enhanced media representation; a greater number of views enhanced media representation; a spatial resolution enhanced media representation; and a quality enhanced media representation.

The location may comprise a location in a further file, wherein the reference pointer may comprise a conditional extraction unit.

The location may comprise a location in the first file, wherein the reference pointer may comprise an extraction unit.

The apparatus may further be caused to perform generating at the location indicated by the reference pointer a further reference pointer to the first signal in the first file location.

The further reference pointer may comprise an extraction unit.

The apparatus may be further caused to perform storing in the first file metadata associated with the first signal and the second signal.

The apparatus may be further caused to perform storing in a further file metadata associated with the first signal and the second signal, wherein the metadata comprises a pointer to the location of the first signal and the second signal.

The apparatus may be further caused to perform: determining a bandwidth of a network; and transmitting the first signal and at least a subset of the second signal over the network.

The apparatus may be further caused to perform: generating a patching indicator configured to indicate to a decoder to concatenate the first signal and the second signal.

The apparatus may be further caused to perform: generating a patching indicator configured to indicate to a receiver to concatenate the first signal and the second signal.

The apparatus may be further caused to perform: generating a patching indicator configured to indicate to a file parser to concatenate the first signal and the second signal.

According to a fourth aspect there is provided an apparatus comprising at least one processor and at least one memory including computer program code the at least one memory and the computer program code configured to, with the at least one processor, cause the apparatus at least to perform: receiving at least a first file comprising a first signal and a reference pointer to a location; and generating at least a first playable signal based on the first signal.

The first signal may comprise a base media representation.

The apparatus may be further caused to perform: determining the content of the location comprises a second signal, the second signal comprising an enhanced media representation; and generating the first playable signal based on the first signal and the second signal.

The enhanced media representation may be at least one of: a temporal resolution enhanced media representation; a greater number of views enhanced media representation; a spatial resolution enhanced media representation; and a quality enhanced media representation.

The location may comprise a location in a further file, and the reference pointer may comprise a conditional extraction unit.

The location may comprise a location in the first file, and the reference pointer may comprise an extraction unit.

The apparatus may be further caused to perform determining at the location indicated by the reference pointer a further reference pointer to the first signal in the first file location.

The further reference pointer may comprise an extraction unit.

The apparatus may be further caused to perform determining in the first file metadata associated with at least the first signal.

The apparatus may be further caused to perform determining in a further file metadata associated with the first signal wherein the metadata comprises a pointer to the location of the first signal.

The apparatus may be further caused to perform: determining a bandwidth of a network; determining at least a subset of the second signal; and requesting the first signal and the at least a subset of the second signal over the network.

According to a fifth aspect there is provided apparatus comprising: a file determiner configured to determine at least a first signal and an associated second signal; a file generator configured to store the first signal in a first file; a pointer generator configured to generate in the first file and associated with the first signal a reference pointer to a location; and further file generator configured to store at the location indicated by the reference pointer the second signal associated with the first signal.

The first signal may be configured to be decodable independent of the second signal.

The first signal may be a base media representation and the second signal may be an enhanced media representation associated with the base media representation.

The enhanced media representation may be at least one of: a temporal resolution enhanced media representation; a greater number of views enhanced media representation; a spatial resolution enhanced media representation; and a quality enhanced media representation.

The location may comprise a location in a further file, wherein the reference pointer may comprise a conditional extraction unit.

The location may comprise a location in the first file, wherein the reference pointer may comprise an extraction unit.

The apparatus may comprise a further pointer generator configured to generate at the location indicated by the reference pointer a further reference pointer to the first signal in the first file location.

The further reference pointer may comprise an extraction unit.

The file generator may further be configured to store in the first file metadata associated with the first signal and the second signal.

The apparatus may comprise a metadata file generator configured to store in a further file metadata associated with the first signal and the second signal, wherein the metadata comprises at least one pointer to the location of the first signal and the second signal.

The apparatus may comprise a network monitor configured to determine a bandwidth of a network; and a transmitter configured to transmit the first signal and at least a subset of the second signal over the network.

The apparatus may comprise an indicator generator configured to generate a patching indicator configured to indicate to a decoder to concatenate the first signal and the second signal.

The apparatus may comprise an indicator generator configured to generate a patching indicator configured to indicate to a receiver to concatenate the first signal and the second signal.

The apparatus may comprise an indicator generator configured to generate a patching indicator configured to indicate to a file parser to concatenate the first signal and the second signal.

According to a sixth aspect there is provided an apparatus comprising: an input configured to receive at least a first file comprising a first signal and a reference pointer to a location; and a decoder configured to generate at least a first playable signal based on the first signal.

The first signal may comprise a base media representation.

The decoder may further comprise a pointer decoder configured to determine the content of the location comprises a second signal, the second signal comprising an enhanced media representation; wherein the decoder is configured further to generate the first playable signal based on the first signal and the second signal.

The enhanced media representation may be at least one of: a temporal resolution enhanced media representation; a greater number of views enhanced media representation; a spatial resolution enhanced media representation; and a quality enhanced media representation.

The location may comprise a location in a further file, and the reference pointer may comprise a conditional extraction unit.

The location may comprise a location in the first file, and the reference pointer may comprise an extraction unit.

The decoder may further comprise a further pointer decoder configured to determine at the location indicated by the reference pointer a further reference pointer to the first signal in the first file location.

The further reference pointer may comprise an extraction unit.

The apparatus may further comprise a metadata decoder configured to determine in the first file metadata associated with at least the first signal.

The apparatus may further comprise a further metadata decoder configured to determine in a further file metadata associated with the first signal wherein the metadata comprises a pointer to the location of the first signal.

The apparatus may further comprise: a network monitor configured to determine a bandwidth of a network; the input further configured to determine receipt of at least a subset of the second signal; and a request generator configured to request the first signal and the at least a subset of the second signal over the network.

According to a seventh aspect there is provided apparatus comprising: signal processing means for determining at least a first signal and an associated second signal; file processing means for storing the first signal in a first file; linking means for generating in the first file and associated with the first signal a reference pointer to a location; and wherein the file processing means further store at the location indicated by the reference pointer the second signal associated with the first signal.

The first signal may be configured to be decodable independent of the second signal.

The first signal may be a base media representation and the second signal may be an enhanced media representation associated with the base media representation.

The enhanced media representation may be at least one of: a temporal resolution enhanced media representation; a greater number of views enhanced media representation; a spatial resolution enhanced media representation; and a quality enhanced media representation.

The location may comprise a location in a further file, wherein the reference pointer may comprise a conditional extraction unit.

The location may comprise a location in the first file, wherein the reference pointer may comprise an extraction unit.

The apparatus may comprise further linking means for generating at the location indicated by the reference pointer a further reference pointer to the first signal in the first file location.

The further reference pointer may comprise an extraction unit.

The file processing means may further store in the first file metadata associated with the first signal and the second signal.

The apparatus may comprise metadata file processing means for storing in a further file metadata associated with the first signal and the second signal, wherein the metadata comprises at least one pointer to the location of the first signal and the second signal.

The apparatus may comprise network monitor means for determining a bandwidth of a network; and an output means for outputting the first signal and at least a subset of the second signal over the network based on the network monitor means.

The apparatus may comprise an indicator generator means for generating a patching indicator configured to indicate to a decoder to concatenate the first signal and the second signal.

The apparatus may comprise an indicator generator means for generating a patching indicator configured to indicate to a receiver to concatenate the first signal and the second signal.

The apparatus may comprise an indicator generator means for generating a patching indicator configured to indicate to a file parser to concatenate the first signal and the second signal.

According to an eighth aspect there is provided an apparatus comprising: input means for receiving at least a first file comprising a first signal and a reference pointer to a location; and decoding means for generating at least a first playable signal based on the first signal.

The first signal may comprise a base media representation.

The decoding means may comprise pointer decoder means for determining the content of the location comprises a second signal, the second signal comprising an enhanced media representation; wherein the decoding means further generate the first playable signal based on the first signal and the second signal.

The enhanced media representation may be at least one of: a temporal resolution enhanced media representation; a greater number of views enhanced media representation; a spatial resolution enhanced media representation; and a quality enhanced media representation.

The location may comprise a location in a further file, and the reference pointer may comprise a conditional extraction unit.

The location may comprise a location in the first file, and the reference pointer may comprise an extraction unit.

The decoding means may further comprise a further pointer decoder means for determining at the location indicated by the reference pointer a further reference pointer to the first signal in the first file location.

The further reference pointer may comprise an extraction unit.

The apparatus may further comprise metadata decoder means for determining in the first file metadata associated with at least the first signal.

The apparatus may further comprise a further metadata decoder means for determining in a further file metadata associated with the first signal wherein the metadata comprises a pointer to the location of the first signal.

The apparatus may further comprise: network monitoring means for determining a bandwidth of a network; input determination means for determining at least a subset of the second signal; and request generating means for requesting the first signal and the at least a subset of the second signal over the network.

According to a ninth aspect there is provided a method comprising: generating at least one file comprising media data, wherein the media data comprises a first part of media data and a second part of media data, and the first piece of media data being decodable independently of the second piece of media data.

Generating may further comprise: generating a first sample into the at least one file, the sample comprising a first data unit and a second data unit, the first data unit comprising the first piece of media data, the second data unit comprising a conditional data reference pointer.

Generating may further comprise: generating the second piece of media data into the at least one file, and setting the conditional data reference pointer to refer to the second piece of media data.

The first file may comprise at least one of: a file conforming to a first file format wherein the conditional data reference pointer is ignored, and a file conforming to a second file format wherein the conditional data reference pointer is resolved.

The at least one file comprises a first file and a second file wherein generating comprises generating the sample into the first file, and generating the second piece of media data into the second file.

According to a tenth aspect there is provided a method comprising: providing an indicator indicating conversion of a first file segment and a second file segment to a file, the first file segment comprising a media data section wherein the indicator further indicating that when the media data section is patched when incomplete.

The method may further comprise providing a further indicator to indicate that the first file segment and the second file segment are concatenated to form patched continuous file.

According to an eleventh aspect there is provided a method comprising: requesting a transmission of at least one file segment collectively comprising a media data section; receiving the at least one file segment; determining the media data section is incomplete; patching the media data section when the media data section is incomplete, and concatenating the patched media data section into a file.

The media data section may comprise an indication of a size of the media data section.

Determining media section is incomplete may further comprise: determining that the media data section is incomplete when the indication of the size of the media data section is greater than that the size of the media data section.

The at least one file segment may comprise file metadata and the file metadata may comprise a reference to a byte range in media data.

Determining media data section is incomplete when the byte range is at least partly absent in the at least one file segment.

According to an eleventh aspect there is provided a method comprising: determining whether a byte range within at least one file is requested; requesting transmission of the at least first file comprising media data, the at least first file comprising a sample, the sample comprising a first data unit and a second data unit, the first data unit comprising a first piece of media data, the second data unit comprising a data reference pointer, the data reference pointer referring to a byte range within the at least one file; receiving the sample; and writing the sample into at least second file.

The method may further comprise writing at least one element in place of the byte range into the at least second file, the at least one element comprising an indication of an omission of the byte range.

According to a twelfth aspect there is provided a method for parsing at least one file comprising media data, the at least one file comprising a sample, the sample comprising a first data unit and a second data unit, the first data unit comprising a first piece of media data, the second data unit comprising a conditional data reference pointer, comprising: extracting the first data unit or the first piece of media data from the sample; identifying whether a destination byte range of the conditional data reference pointer comprises media data present in the at least one file; and extracting a second piece of media data from the destination byte range when the destination byte range comprises media data.

The method may further comprise: inserting the first data unit or the first piece of media data into an access unit; and appending the second piece of media data into the access unit when the destination byte range comprises media data present in the at least one file.

The method may further comprise: decoding the access unit.

The method may further comprise: identifying the destination byte range does not contain media data based on at least one element in the destination byte range indicating absence of media data or based on the destination byte range residing in a non-existing file.

The method may further comprise: decoding the first data unit or the first piece of media data; and decoding the second piece of media data when the destination byte range comprises media data present in the at least one file.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

DESCRIPTION OF EMBODIMENTS OF THE APPLICATION

The following describes in more detail possible mechanisms for the provision of scalable progressive download and streaming media apparatus. In this regard reference is first made to FIG. 1a which shows a schematic block diagram of an example streaming system which can incorporate embodiments of the application, FIG. 1b which shows an example apparatus suitable for implementing within the system shown in FIG. 1a and FIG. 2 which describes an example operation of the system shown in FIG. 1a.

The streaming system 10 can in some embodiments comprise a server 1 and a client 3 which are configured to be coupled by a suitable communications protocol. In the following examples the server 1 and client 3 are coupled and communicate using a hypertext transfer protocol (HTTP) application layer communications protocol. However it would be understood that any suitable application layer communications protocol could be employed.

Figure 1A:
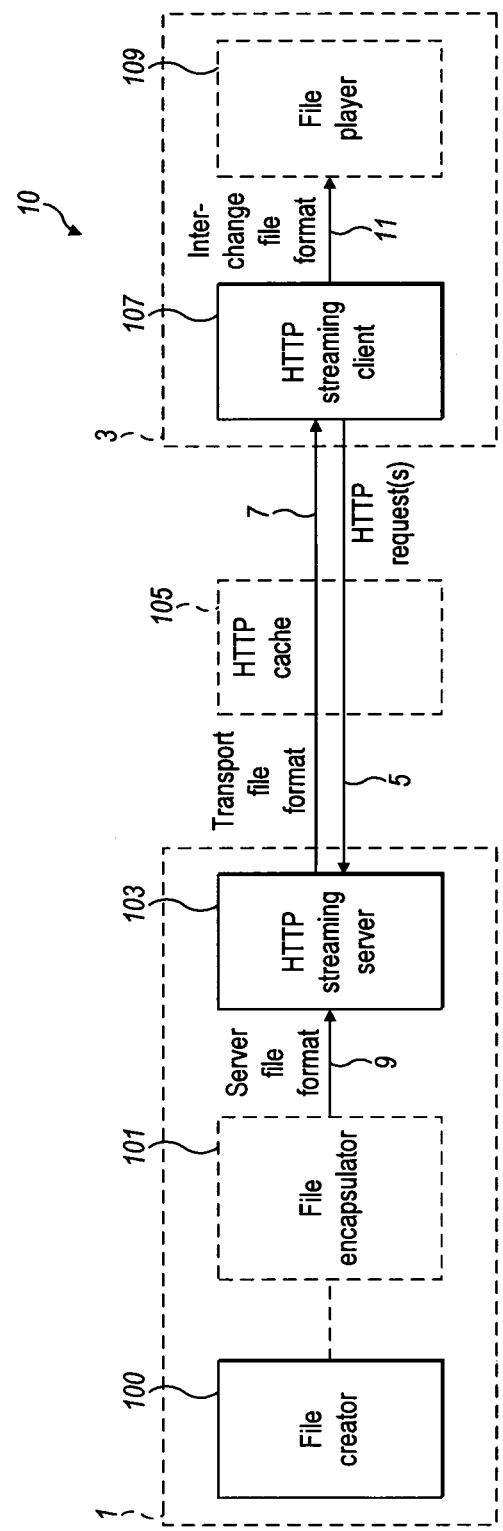
FIG. 1a shows schematically a system suitable for employing some embodiments of the application
Figure 1B:
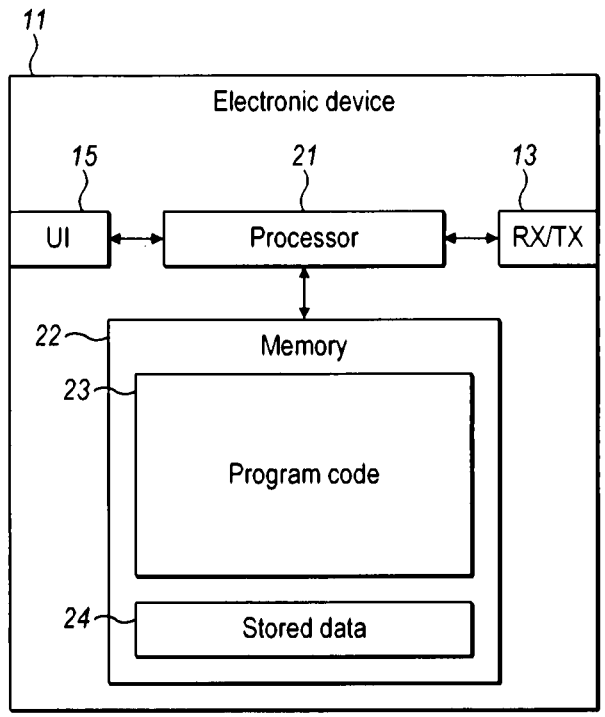
FIG. 1b shows schematically an electronic device suitable for employing some embodiments of the application.

With respect to FIG. 1b an electronic device or apparatus 11 is shown which may according to embodiments of the application be employed within the system shown in FIG. 1a as at least one of the server 1 and/or the client 3 and/or the HTTP cache 105.

The apparatus 11 can be, for example when employed as a client 3, a mobile terminal or user equipment of a wireless communication system. In other embodiments the apparatus 11 operating as a client can be an audio-video device such as video camera, a Television (TV) receiver, audio recorder or audio player such as a mp3 recorder/player, a media recorder (also known as a mp4 recorder/player), or any computer suitable for the processing of media signals.

The apparatus 11 can comprise a processor 21 coupled to a transceiver (RX/TX) 13, to a user interface (UI) 15 and to a memory 22.

The processor 21 in some embodiments can be configured to execute various program codes. The implemented program codes in some embodiments comprise a media encoding code for encoding media data signals when implemented as a server 1 or media decoding code for decoding media data when implanted as a client 3. The implemented program code or programs can in some embodiments be stored for example in the memory 22 for retrieval by the processor 21 whenever needed. In some embodiments the program code can be stored in a program code section 23 of the memory. In some embodiments the memory 22 can further comprise a data storage section 24 for storing data, for example data that has been encoded/or awaiting decoding in accordance with the invention.

The encoding and decoding code in embodiments can be implemented in hardware or firmware.

The apparatus 11 in some embodiments comprises user interface 15 or user interface means for enabling a user to input commands to the apparatus 11 directly, for example via a keypad, and/or to obtain information from the apparatus 11 directly, for example via a display. In some embodiments a touch screen may provide both input and output functions for the user interface. The apparatus 11 in some embodiments further comprises a transceiver 13 suitable for enabling communication with other apparatus, for example via a wired or wireless communication network.

It is to be understood again that the structure of the apparatus 10 could be supplemented and varied in many ways.

The client 3 in some embodiments can comprise a HTTP streaming client 107 configured to be able to generate and output on a suitable communications link HTTP requests 5, for example a request to get a particular media file such as a video or audio clip. The HTTP requests can as will be discussed below be passed via a HTTP cache 105 to the server 1.

In some embodiments the HTTP streaming client is configured to perform HTTP pipelining. HTTP pipelining is a technique in which multiple HTTP requests are written out to a single socket without waiting for the corresponding responses. Pipelining is only supported in HTTP/1.1, not in 1.0. Since it is usually possible to fit several HTTP requests in the same (Transport Control Protocol) TCP packet, HTTP pipelining allows fewer TCP packets to be sent over the network, reducing network load.

A TCP connection is in some embodiments identified by a quadruplet of: server IP address, server port number, client IP address, and client port number. Multiple simultaneous TCP connections from the same client 1 to the same server 3 are therefore possible, since each client process is assigned a different port number. Thus, even if the requests all access the same server process (such as the Web server process at port 80 dedicated for HTTP), the requests all have a different client socket and represent unique connections. This enables several simultaneous requests to the same Web site from the same computer.

Figure 2:
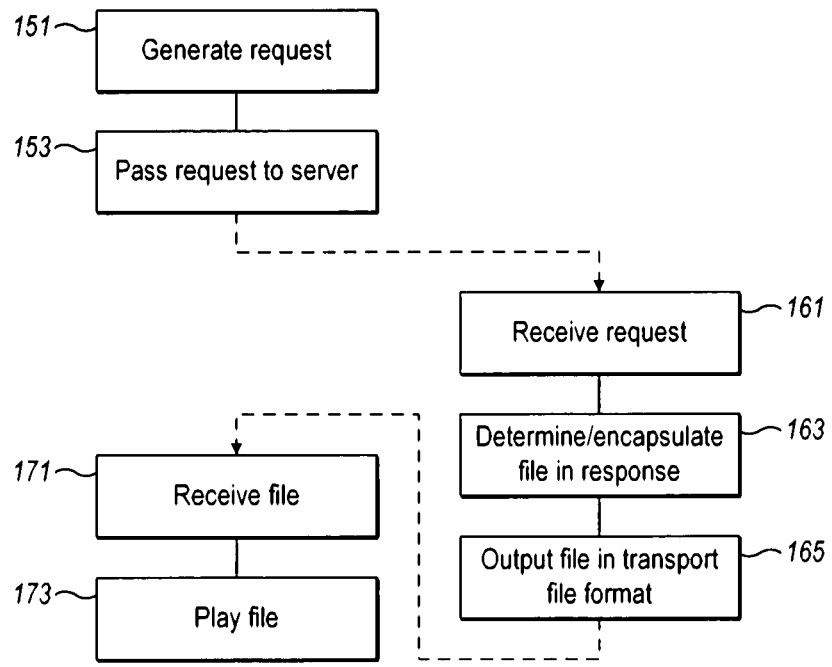
FIG. 2 shows schematically the operation of a system as shown in FIG. 1a employing some embodiments of the application.

The operation of generating a request is shown in FIG. 2 by step 151.

The request can then be output over the network to the server 1. The operation of passing the request to the server 1 is shown in FIG. 2 by step 153.

The server in some embodiments comprises a HTTP streaming server 103. The HTTP streaming server 103 is configured to receive HTTP requests and control the generation of responses to the received HTTP request.

The operation of receiving the request at the server is shown in FIG. 2 by step 161.

The HTTP streaming server 103 can in some embodiments respond to HTTP requests from an HTTP streaming client 107 by controlling the file generation and encapsulation of files. The HTTP streaming server 103 can further be configured to output and transmit a file or many files of the media presentation formatted according to a transport file format and encapsulated in HTTP requests.

Figure 14:
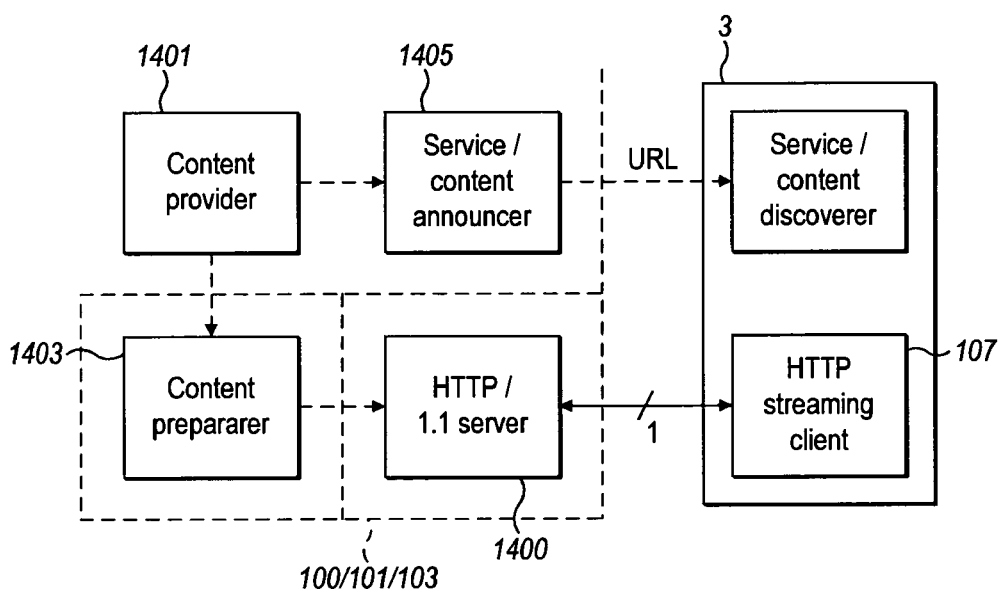
FIG. 14 shows schematically a static HTTP server configuration suitable for employing embodiments of the application.

In some embodiments the HTTP streaming server 103 can be implemented by a HTTP server 1400 configured to be operating in a "static" mode such as found in a regular web server. An example of a system operating in this mode is shown in FIG. 14. In this mode, a content provider 1401 can provide content to a service/content announcement server 1405 which via a URL can be discovered by the client 3 comprising a service/content discoverer 1409. The HTTP streaming client 107 can request one or more of the files of the presentation (content) from the HTTP server 1400. The files can be formatted according to the server file format to be transmitted entirely or partly. The HTTP server 1400 in these embodiments is not required to prepare the content by any means. In such embodiments instead a content preparer 1403 receives the content from the content provider 1401 and preparation is done in advance, possibly offline, by the content preparer 1403.

Figure 15:
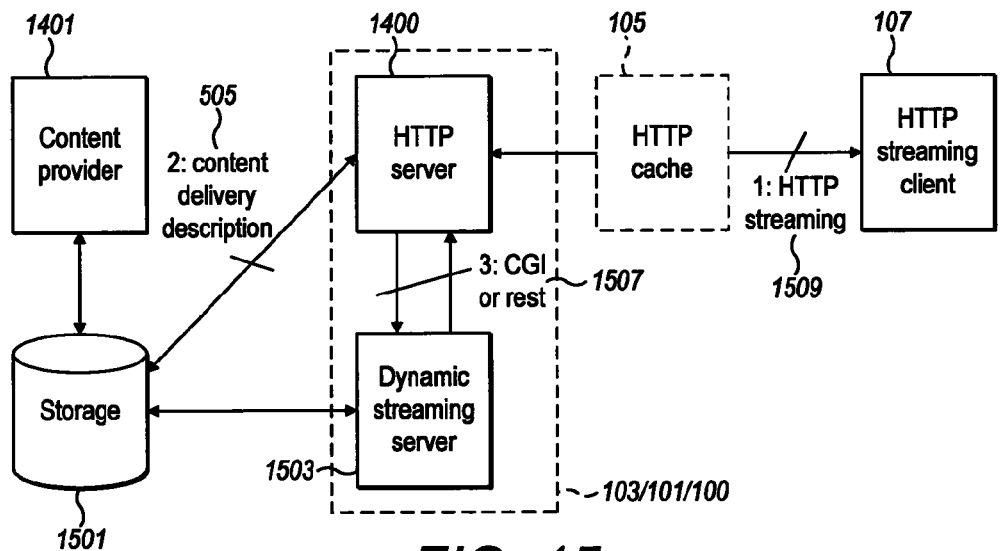
FIG. 15 shows schematically a semi-static HTTP server configuration suitable for employing embodiments of the application.

In some embodiments the HTTP streaming server 103 is implemented as a separate regular web HTTP server 1400 operationally connected with a dynamic streaming server 1503. Such a system is shown in FIG. 15 whereby the content provider 1401 is configured to provide content to storage means 1501. The dynamic streaming server 1503 is configured in some embodiments to dynamically tailor the streamed content to a client, for example a HTTP streaming client 107 via the HTTP server 1400 (and in some embodiments via a HTTP cache 105 based on requests from the client. The HTTP streaming interface 1509 between the HTTP server 1400 and HTTP streaming client 107 in some embodiments is based on the HTTP protocol and defines the syntax and semantics of the HTTP Streaming requests and responses. The HTTP Streaming requests/responses are for example based on the HTTP GET requests/responses.

In such embodiments the HTTP server 1400 and dynamic streaming server 1503 combination can be configured to interpret the incoming HTTP GET request and identify the requested media samples from a given content. The content delivery description interface between the HTTP server 1400 and the storage means 1501 enables access to the content delivery description. The content delivery description (a.k.a. media presentation description) can in some embodiment be provided by the content provider or the service provider. It gives information about the means to access the related content. In particular, it describes if the content is accessible via HTTP Streaming and how to perform the access. The content delivery description is usually retrieved via HTTP GET requests/responses. The interface between the HTTP server 1400 and the dynamic streaming server 1503 is in some embodiments the Common Gateway Interface (CGI) 1507, which is a standardized and widely deployed interface between web servers and dynamic content creation servers. In some other embodiments the interface between the HTTP server 1400 and the dynamic streaming server 1503 can be a Representational State Transfer (REST) interface are possible and would enable the construction of more cache-friendly resource locators.

REST interfaces are a style of software architecture for distributed hypermedia systems such as the World Wide Web. REST-style architectures consist of clients and servers which pass requests and responses between each other. Requests and responses are built around the transfer of "representations" of "resources". A resource can be any coherent and meaningful concept that may be addressed. A representation of a resource is typically a document that captures the current or intended state of a resource. At any particular time, a client can either be transitioning between application states or "at rest". A client in a rest state is able to interact with its user, but creates no load and consumes no per-client storage on the set of servers or on the network. The client begins sending requests when it is ready to transition to a new state. While one or more requests are outstanding, the client is considered to be transitioning states. The representation of each application state contains links that may be used next time the client chooses to initiate a new state transition.

The Common Gateway Interface (CGI) is a standard (see RFC3875: CGI Version 1.1) that defines how webserver software can delegate the generation of webpages to a console application. Such applications are known as CGI scripts; they can be written in any programming language, although scripting languages are often used. The task of a webserver is to respond to requests for webpages issued by clients (usually web browsers) by analyzing the content of the request (which is mostly in its URL), determining an appropriate document to send in response, and returning it to the client. If the request identifies a file on disk, the server can just return the file's contents. Alternatively, the document's content can be composed on the fly. One way of doing this is to let a console application compute the document's contents, and tell the web server to use that console application. CGI specifies which information is communicated between the webserver and such a console application, and how.

The HTTP server 1400 and dynamic streaming server 1503 combination then locates the requested media samples in the content file(s) or from the live stream. The HTTP server 1400 and dynamic streaming server 1503 combination then extracts and envelopes the requested media samples in a container. Subsequently, the newly formed container with the media samples is delivered to the client in the HTTP GET response body.

Furthermore in some embodiments the dynamic HTTP streaming server 103 can be implemented by combining the HTTP server and the dynamic streaming server functionality in a single server 1 the operation of which will be described hereafter. In addition, in some embodiments a dynamic HTTP streaming server 103 can be state-keeping.

Furthermore the HTTP streaming server 103 can be configured in some embodiments to realize HTTP streaming in two modes of operation: static HTTP streaming and dynamic HTTP streaming. In the static HTTP streaming case, the content is prepared in advance or independent of the server. The structure of the media data is not modified by the server to suit the clients' needs. A regular web server (a.k.a. HTTP server) in "static" mode can only operate in static HTTP streaming mode. In the dynamic HTTP streaming case, the content preparation is done dynamically at the server upon receiving a non-cached request. A regular web server operationally connected with a dynamic streaming server and a dynamic HTTP streaming server can be operated in the dynamic HTTP streaming mode.

The server 1 in some embodiments can comprise a file creator 100. The file creator 100 determines the files and data required in response to control from the HTTP streaming server 103. In some embodiments the File creator is a content generator. In such embodiments, the File creator may comprise one or more media encoders generating scalable media bitstreams. In some other embodiments the File creator 100 is a storage means whereby the relevant media data can be retrieved, and in further embodiments the File creator 100 is a processor means coupled to storage means for selective retrieval of data and file creation.

Figure 3:
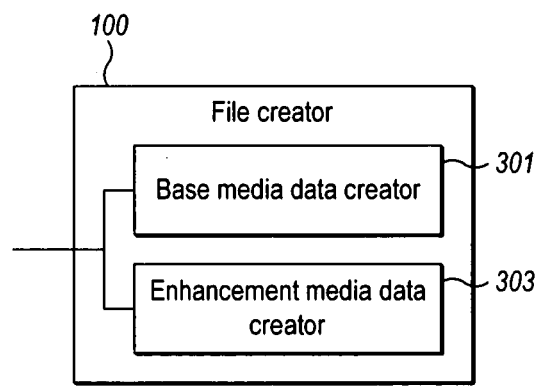
FIG. 3 shows schematically the file creator and file encapsulator shown in FIG. 1a in further detail.
Figure 4:
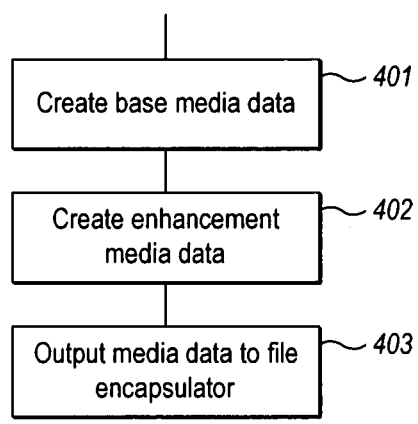
FIG. 4 shows schematically the operation of the file creator according to some embodiments of the application.

With respect to FIG. 3 a schematic view of a file creator 100 or any suitable signal processing means according to embodiments of the application is shown. Furthermore the operation of a file creator according to some embodiments is shown in FIG. 4. The File creator 100 in some embodiments comprises a base media data creator 301 and an enhanced media data creator 303. The file creator 100 base media data creator 301 is configured to divide or generate the scalable media bitstream into a base media data part. The base media data represents a decodable base-quality version of the media data. It can, for example, be the base layer representation of a scalable media stream or a base view of a multiview media stream.

The generation/determination/division of the scalable media data into base media data is shown in FIG. 4 by step 401.

The file creator 100 enhanced media data creator 303 is furthermore configured to divide/generate the scalable media into an enhancement media data part. The enhancement media data can, for example, be an enhancement layer representation of a scalable media stream or one or more non-base views of a multiview media stream.

The generation/determination/division of the scalable media data into enhanced media data is shown in FIG. 4 by step 402.

It would be understood that in some embodiments the enhanced media data creator 303 can furthermore generate further sub-divisions of the enhanced media data, for example a first enhanced layer, and a second enhanced layer whereby each further layer is a further enhancement to the media signal. Furthermore each layer can in some embodiments be processed separately in a manner similar to the processing of the base and enhanced layers as is described hereafter with respect to the file encapsulator 101.

The file creator 100 then outputs the base and enhanced media data to the file encapsulator 101. The outputting of the base and enhancement media data to the file encapsulator 101 is shown in FIG. 4 by step 403.

In some embodiments the server comprises a file encapsulator 101. The file encapsulator 101 can in some embodiments take media bitstreams of a media presentation as an input and encapsulate the bitstreams in one or more container files. The file encapsulator 101 can furthermore in some embodiments convert the media bitstreams into one or more files, which can be processed by the HTTP streaming server. The output of the file encapsulator is formatted according to a server file format 9.

The file encapsulator 101 can in some embodiments generate a suitable server file format for the container file or files that the HTTP streaming server can manage and use to create responses for HTTP requests.

The multimedia container file format is an important element in the chain of multimedia content production, manipulation, transmission and consumption. There are substantial differences between the coding format or the elementary stream format and the container file format. The coding format relates to the action of a specific coding algorithm that codes the content information into a bitstream. The container file format comprises means of organizing the generated bitstream in such way that it can be accessed for local decoding and playback, transferred as a file, or streamed, all utilizing a variety of storage and transport architectures. Furthermore, the file format can facilitate interchange and editing of the media as well as recording of received real-time streams to a file.

Figure 13:
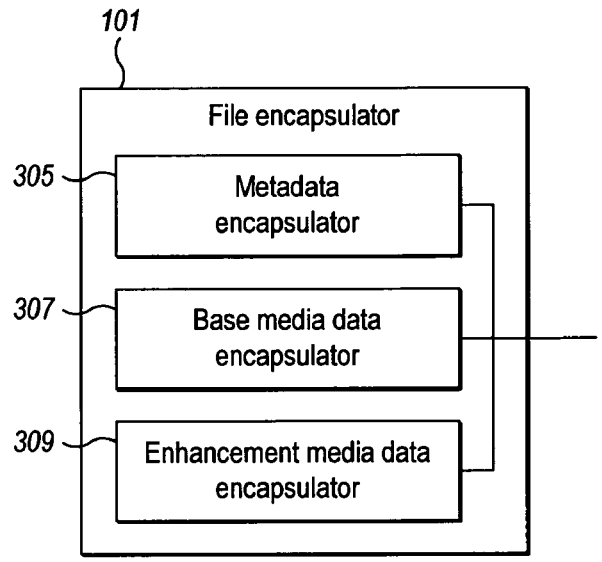
FIG. 13 shows schematically the file encapsulator shown in FIG. 1a in further detail.

With respect to FIG. 13 a file encapsulator 101 or any suitable file processing and/or linking means according to embodiments of the application is shown. The file encapsulator 101 in some embodiments comprises a metadata encapsulator 305, a base media data encapsulator 307 and an enhancement media data encapsulator 309 coupled to operate on the output of the file creator 100 to output a server file accessible by both existing progressive download clients and HTTP streaming clients capable of bitrate adaptation.

The format can also be used in combination with existing adaptive HTTP streaming solutions using file segments as transmission file format. The embodiments of the application enable the use of scalable media coding in a manner that a server file can be both downloaded progressively in a conventional manner and used as a source to create file segments for adaptive HTTP streaming. Furthermore, the embodiments of the application enable straightforward conversion of received file segments into an existing interchange file format.

In some embodiments the file creator 100 and the file encapsulator 101 are combined into a single file creator/encapsulator. In some embodiments the file creator 100 and/or the file encapsulator 101 are not considered parts of the server 1 but may instead be included in content creation tools such as video editing software.

Figure 5:
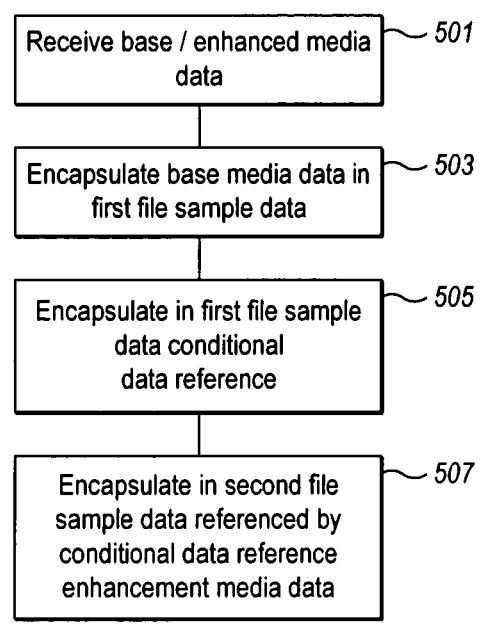
FIG. 5 shows a schematically the operation of the file encapsulator according to some embodiments of the application.

With respect to FIG. 5 the operation of the file encapsulator 101 according to some embodiments of the application is shown.

The file encapsulator 101 in some embodiments is configured to receive the base and enhanced media data from the file creator 100.

The operation of receiving the base and enhanced media data is shown in FIG. 5 by step 501.

The metadata encapsulator 305 can in some embodiments encapsulate metadata associated with the media in a first file. Furthermore in some embodiments the base media data encapsulator 307 encapsulates or stores base media data into the first file as a track in the file. In order to keep the following examples simple, only one media type, video, is described hereafter, although typical multimedia presentations contain more than one continuous media type, for example audio and video media and each media type can in some embodiments be processed in similar ways described hereafter or in some further embodiments a combined media type be processed. The encapsulators can in some embodiments be represented as file processing means for signal encapsulation and linking means for generating and configuring the pointers as described within the application.

The media data in some embodiments are scalable media data. For example in some embodiments the invention can employ scalable video coding (SVC) of the Advanced Video Coding (H.264/AVC) standard files.

SVC is specified In Annex G of the H.264/AVC standard jointly developed by the Telecommunication Standardization Sector of International Telecommunication Union (ITU-T) and International Organization for Standardization (ISO)/International Electrotechnical Commission (IEC) Joint Technical Committee 1 (JTC 1).

In scalable video coding, a video signal can be encoded into a base layer and one or more enhancement layers. An enhancement layer enhances the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level.

A scalable layer together with all of its dependent layers can be referred to as a "scalable layer representation". The portion of a scalable bitstream corresponding to a scalable layer representation can be extracted and decoded to produce a representation of the original signal for certain fidelity levels.

In some embodiments the video signal is encoded in a Fine Grained (granularity) Scalability (FGS) where data in an enhancement layer can be truncated after a certain location, or even at arbitrary positions, and where each truncation position may include additional data representing increasingly enhanced visual quality.

In some embodiments the video signal is encoded in a coarse-grained (granularity) scalability (CGS) where data in an enhancement layer cannot be truncated after a certain location. CGS collectively includes traditional quality (SNR) scalability and spatial scalability.

Furthermore in some embodiments the video signal is encoded in medium-grained scalability (MGS), where quality enhancement pictures are coded similarly to SNR scalable layer pictures but indicated by high-level syntax elements similarly to FGS layer pictures, by having the quality_id syntax element greater than 0.

In some embodiments SVC uses an inter-layer prediction mechanism, wherein certain information can be predicted from layers other than the currently reconstructed layer. Information that could be inter-layer predicted includes intra texture, motion and residual data. Inter-layer motion prediction includes the prediction of block coding mode, header information, etc., wherein motion from the lower layer may be used for prediction of the higher layer. In the example of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

In some embodiments SVC specifies a concept known as single-loop decoding. Single-loop decoding is enabled by using a constrained intra texture prediction mode, whereby the inter-layer intra texture prediction can be applied to macroblocks (MBs) for which the corresponding block of the base layer is located inside intra-MBs. At substantially the same time, those intra-MBs in the base layer use constrained intra prediction (i.e. having the syntax element constrained_intra_pred_flag equal to 1).

In such embodiments employing single-loop decoding, the decoder needs to perform motion compensation and full picture reconstruction only for the scalable layer desired for playback (called the desired layer or the target layer), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer:

A single decoding loop is needed in some embodiments for decoding of most pictures, while a second decoding loop can in some embodiments be selectively applied to reconstruct the base representations, which are needed as prediction references but not for output or display, and are reconstructed only for the so called key pictures (for which the value of the variable store_ref_base_pic_flag can in some embodiments be equal to 1).

The scalability structure in SVC files can in some embodiments be characterized by three syntax elements: temporal_id, dependency_id and quality_id. The syntax element temporal_id can in some embodiments indicate the temporal scalability hierarchy or, indirectly, the frame rate. A scalable layer representation comprising pictures of a smaller maximum temporal_id value has a smaller frame rate than a scalable layer representation comprising pictures of a greater maximum temporal_id. A given temporal layer typically furthermore depends on the lower temporal layers (i.e., the temporal layers with smaller temporal_id values) but never depends on any higher temporal layer. The syntax element dependency_id in some embodiments indicates the CGS inter-layer coding dependency hierarchy (which, as mentioned earlier, includes both SNR and spatial scalability). At any temporal level location, a picture of a smaller dependency_id value may be used for inter-layer prediction for coding of a picture with a greater dependency_id value. The syntax element quality_id is used to indicate the quality level hierarchy of a FGS or MGS layer. At any temporal location, and with an identical dependency_id value, a picture with quality_id equal to QL uses the picture with quality_id equal to QL-1 for Inter-layer prediction. A coded slice with quality_id larger than 0 can in some embodiments be coded as either a truncatable FGS slice or a non-truncatable MGS slice. In addition, a priority_id in some embodiments specifies a priority identifier for the respective video coding NAL unit.

A sub-bitstream extraction process is specified in the SVC standard. The sub-bitstream extraction process converts an SVC bitstream into another SVC or H.264/AVC bitstream having a subset of the video coding layer NAL units. The subset is specified as values of target priority_id, quality_id, temporal_id, and/or priority_id. The resulting bitstream does not contain greater values of priority_id, quality_id, temporal_id, and/or priority_id than the target values. The file creator 100 and/or the file encapsulator 101 may use the sub-bitstream extraction process for dividing scalable media into base media data part and enhancement media data part.

The scalability characteristics in MVC files can in some embodiments be characterized by three syntax elements: temporal_id, priority_id, and view_id. temporal_id and priority_id are similar to the respective syntax elements in SVC. view_id indicates the view or the source camera for the associated video coding NAL unit. A sub-bitstream extraction process is specified in the MVC standard, taking as input a target temporal_id and priority_id and a list of view_id values to be included in the resulting bitstream subset. The file creator 100 and/or the file encapsulator 101 may use the sub-bitstream extraction process for dividing scalable media into base media data part and enhancement media data part.

In some embodiments, all the data units (i.e. Network Abstraction Layer units or NAL units in the SVC context) in one access unit having identical value of dependency_id are referred to as a dependency unit or a dependency representation. Within one dependency unit, all the data units having an identical value of quality_id can be referred to as a quality unit or layer representation.

A base representation, also known as a decoded base picture, is a decoded picture resulting from decoding the Video Coding Layer (VCL) NAL units of a dependency unit having quality_id equal to 0 and for which the store_ref_base_pic_flag is set equal to 1. An enhancement representation, also referred to as a decoded picture can also result from the regular decoding process in which all the layer representations that are present for the highest dependency representation are decoded.

Each H.264/AVC VCL NAL unit (with NAL unit type in the range of 1 to 5) is preceded by a prefix NAL unit in an SVC bitstream. A compliant H.264/AVC decoder implementation according to some embodiment thus ignores prefix NAL units. The prefix NAL unit can in some embodiments include the temporal_id value and hence an SVC decoder, for example the file player 109, that decodes the base layer, can learn from the prefix NAL units the temporal scalability hierarchy. Moreover, the prefix NAL unit includes reference picture marking commands for base representations.

Furthermore in some embodiments the SVC files can implement the same mechanism as H.264/AVC to provide temporal scalability. Temporal scalability can in some embodiments provide refinement of the video quality in the temporal domain, by giving flexibility of adjusting the frame rate.

In some embodiments temporal scalability can be implemented within video coding data by using the B pictures in MPEG-1 Visual. As a B picture is bi-predicted from two pictures, one preceding the B picture and the other succeeding the B picture in display order, the codec uses two prediction blocks from two reference pictures which are averaged sample-wise to get the final prediction block. In some embodiments a B picture is a non-reference picture, in other words it is not used for inter-picture prediction reference by other pictures. Consequently, the B pictures in some embodiments can be discarded to achieve a temporal scalability point with a lower frame rate. The same mechanisms can be implemented for providing temporal scalability for MPEG-2 Video, H.263 and MPEG-4 Visual files.

The implementation of temporal scalability in H.264/AVC embodiments differs as the concept of B pictures or B slices have been changed. In the H.264/AVC standard the definition of B slice is a slice that can be decoded using intra prediction from decoded samples within the same slice or inter prediction from previously-decoded reference pictures, using at most two motion vectors and reference indices to predict the sample values of each block. In such embodiments both the bi-directional prediction property and the non-reference picture property of the conventional B picture concept are therefore no longer valid as a block in a B slice can in some embodiments be predicted from two reference pictures in the same direction in display order, and a picture consisting of B slices may be referred by other pictures for inter-picture prediction.

However in some embodiments H.264/AVC, SVC and MVC, temporal scalability can be achieved by using non-reference pictures and/or hierarchical inter-picture prediction structure. Using only non-reference pictures is able to achieve similar temporal scalability as using conventional B pictures in MPEG-1/2/4, by discarding non-reference pictures. Hierarchical coding structures such as implemented in some embodiments therefore can achieve a flexible temporal scalability.

Figure 16:
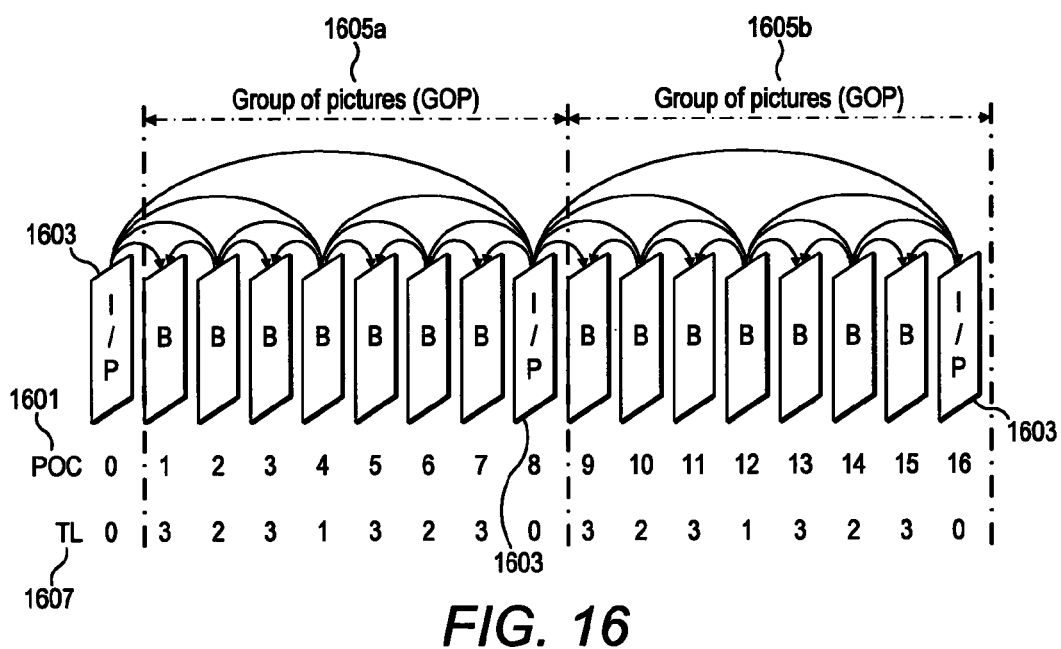
FIG. 16 shows schematically temporal scalable video suitable for employing in embodiments of the application.

With reference to FIG. 16 a typical hierarchical coding structure which can be employed in embodiments of the application is shown. In this example four levels of temporal scalability are shown however it would be understood that more than or less than four levels can be implemented in some embodiments of the application. The display order is indicated by the values denoted as picture order count (POC) 1601. The temporal structure is indicated by the values denoted as temporal level (TL) 1607, which are equal to values of temporal_id. The I or P pictures 1603, also referred to as key pictures, are coded in some embodiments as the first picture of a group of pictures (GOPs) 1605 in decoding order. In FIG. 16 two groups of pictures 1605a and 1605b are shown. When a key picture is inter coded, the previous key pictures are used as reference for inter-picture prediction. These pictures correspond to the lowest temporal level (denoted as TL 1607 in the figure) in the temporal scalable structure and are associated with the lowest frame rate. Pictures of a higher temporal level can in these embodiments only use pictures of the same or lower temporal level for inter-picture prediction. In such embodiments the hierarchical coding structure enables temporal scalability corresponding to different frame rates by discarding pictures of a certain temporal level value and beyond. In FIG. 16 the pictures 0, 8 and 16 are of the lowest temporal level (TL=0), the pictures 4 and 12 the next lowest temporal level (TL=1), the pictures 2, 6, 10 and 15 the next lowest temporal level (TL=2) while the pictures 1, 3, 5, 7, 9, 11, 13 and 15 are of the highest temporal level (TL=3). These pictures of different temporal levels can be used to generate the bitstream of different frame rates. For example in some embodiments the file reader when decoding all the temporal levels could generate a frame rate of 30 Hz, using only up to TL=2 pictures would generate a frame rate of 15 Hz, using up to TL=1 pictures would generate a frame rate of 7.5 Hz, and using the TL=0 pictures generate a frame rate of 3.75 Hz. Other frame rates can therefore be obtained by discarding pictures of some temporal levels. A temporal scalable layer with a lower temporal level or a lower frame rate can also called as a lower temporal layer.

The above hierarchical B picture coding structure is the most typical coding structure for temporal scalability. However, it should be pointed out that much more flexible coding structures are possible. For example in some embodiments the GOP size does not have to be constant over time. In some embodiments another example does not code the temporal enhancement layer pictures as B slices as they may also be coded as P slices.

In some embodiments implementing H.264/AVC, the temporal level can be signalled by the sub-sequence layer number in the sub-sequence information Supplemental Enhancement Information (SEI) messages. In some embodiments implementing SVC, the temporal level can be signalled in the Network Abstraction Layer (NAL) unit header by the syntax element temporal_id. The bitrate and frame rate information for each temporal level can in some embodiments be signalled in the scalability information SEI message.

In some embodiments of the application the file creator/encapsulator is configured to implement coarse grain scalability (CGS) which can comprise spatial scalability and Signal to Noise Ratio (SNR or fidelity) scalability. Spatial scalability in some embodiments supports representations of video with different resolutions. For each time instance Video Coding Layer (VCL) Network Abstraction Layer (NAL) units are coded in the same access unit and these VCL NAL units can correspond to different resolutions. During the decoding, for example in some embodiments within the file reader, a low resolution VCL NAL unit provides the motion field and residual which can be optionally inherited by the final decoding and reconstruction of the high resolution picture. Compared to previous video compression standards, the SVC's spatial scalability has been generalized to enable in some embodiments the base layer to be a cropped and zoomed version of the enhancement layer.

In some embodiments of the application the file creator/encapsulator is configured to implement MGS quality layers, which can be indicated with quality_id data elements in a manner similar to FGS quality layers. In such embodiments the file creator/encapsulator can for each dependency unit (with the same dependency_id), generate a layer with quality_id equal to 0 and other layers with quality_id greater than 0. The layers with quality_id values greater than 0 can be either MGS layers or FGS layers, depending on whether the slices are coded as truncatable slices.

In some embodiments implementing FGS enhancement layers, only inter-layer prediction is used. Therefore, FGS enhancement layers can be truncated freely without causing any error propagation in the decoded sequence. However such embodiments can suffer from low compression efficiency because only low-quality pictures are used for inter prediction references. In some embodiments therefore FGS-enhanced pictures can be used as inter prediction references, with a possible issue of encoding-decoding mismatch, also referred to as drift, when some FGS data is discarded.

In some embodiments it will be understood that the FGS NAL units can be freely dropped or truncated, and MGS NAL units can be freely dropped (but cannot be truncated) without affecting the conformance of the bitstream. As discussed above, when FGS or MGS data has been used for inter prediction reference during encoding, dropping or truncation of the data can in some embodiments result in a mismatch between the decoded pictures in the decoder side and in the encoder side. This mismatch is also referred to as drift.

In some embodiments in order to control drift due to the dropping or truncation of FGS or MGS data, in a certain dependency unit, a base representation (by decoding only the CGS picture with quality_id equal to 0 and all the dependent-on lower layer data) is stored in a decoded picture buffer. Furthermore in such embodiments when encoding a subsequent dependency unit with the same value of dependency_id, all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of dependency_id, all of the NAL units use the decoded pictures for inter prediction reference, for high coding efficiency.

In some embodiments each Network Abstraction Layer (NAL) unit comprises in the NAL unit header a syntax element use_ref_base_pic_flag. When the value of this element is equal to 1, decoding of the NAL unit uses the base representations of the reference pictures during the inter prediction process. The syntax element store_ref_base_pic_flag in such embodiments specifies whether (when equal to 1) or not (when equal to 0) to store the base representation of the current picture for future pictures to use for inter prediction.

NAL units with quality_id greater than 0 in some embodiment are configured not to contain syntax elements related to reference picture lists construction and weighted prediction. In other words the syntax elements num_ref_active_lx_minus1 (x=0 or 1), the reference picture list reordering syntax table, and the weighted prediction syntax table are not present. Consequently, the MGS or FGS layers in such embodiments have to inherit these syntax elements from the NAL units with quality_id equal to 0 of the same dependency unit when needed.

In some embodiments the file creator/encapsulator and HTTP server can be configured to encode the media files in an AVC File Format from ISO/IEC 14496-15 which is based on the ISO Base Media File Format.

A generated AVC stream in such embodiments is a sequence of access units, each divided into a number of Network Abstraction Layer (NAL) units. In an AVC file, all NAL units of an access unit form a file format sample, and, in the file, each NAL unit is immediately preceded by its size in bytes.

Figure 17:
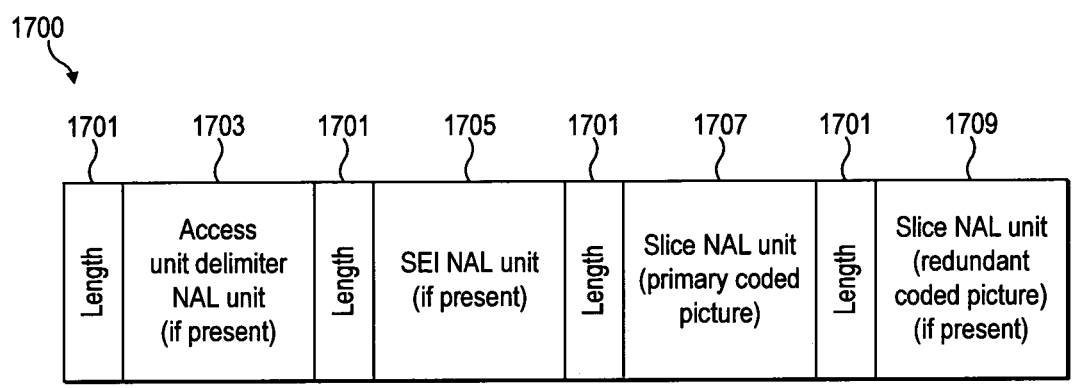
FIG. 17 shows a schematic view of an example NAL file structure.

With respect to FIG. 17 the structure of an AVC sample is shown. In such embodiments the sample 1700 comprises a set of Network Abstraction Layer (NAL) units. Each NAL unit comprises a Length field 1701 configured to indicate the length in bytes of the following NAL unit. In some embodiments the length field can be configured to be 1, 2, or 4 bytes. Furthermore each NAL unit comprises a NAL data unit, for example an Access Unit Delimiter NAL unit 703, a SEI NAL unit 1705, a slice NAL Unit (Primary Coded Picture) 1707 and a slice NAL unit (Redundant Coded Picture) 1709.

In some embodiments SVC and MVC File Formats are generated in a manner similar to the AVC File Format. Furthermore since the SVC and MVC codecs can be operated in a way that is compatible with AVC, the SVC and MVC File Formats can also be used in an AVC-compatible fashion. However, there are some SVC- and MVC-specific structures to enable scalable and multiview operation.

The operation of encapsulating the base media data in the first file sample data is shown in FIG. 5 by step 503.

The enhancement media data encapsulator 309 furthermore is configured to generate and encapsulate within the first file sample data a conditional data reference pointer. In some embodiments the conditional data reference pointer can comprise a conditional extractor NAL unit (Cond. Extr. NAL unit). An extractor NAL unit is configured to provide a way to share data among multiple tracks describing the same scalable or multiview stream and therefore do not enlarge the file excessively.

The operation of encapsulating in the first file sample data a conditional data reference is shown in FIG. 5 by step 505.

In such embodiments an extractor NAL unit is implemented as an in-line structure residing within the sample as all other NAL units. The extractor NAL unit type is specific to the file format. Its NAL unit type value is in some embodiments picked from those NAL unit type values that are reserved in the H.264/AVC for the use of applications. Alternatively in some embodiments the conditional data reference pointer may use the same identifier value as an unconditional data reference pointer, such as an extractor NAL unit of SVC and MVC file formats. However, the data pointed to by the data reference pointer may include such an identifier value which disables the data inclusion by reference. In the SVC and MVC file formats, the data pointed to by the extractor NAL unit may be indicated to contain zero-sized NAL units. Alternatively, the file pointed to by the data reference pointer need not be present and consequently no data is extracted from the file.

An extractor NAL unit can in some embodiments be structured similarly to other NAL units.

In such embodiments the extractor NAL unit comprises instructions to copy a certain piece of data from a sample of another track to replace the extractor NAL unit in the access unit that is passed to decoding. In other words, an extractor NAL unit is a run-time de-referenceable pointer to a byterange of the time-parallel sample in one of the linked tracks.

The extractor NAL unit in some embodiments enable different types of tracks. For example in some embodiments the H.264/AVC base layer or base view of the bitstream can be included in samples as video coding NAL units, whereas the enhancement layers or non-base views, respectively, can be contained in extractor NAL units. Such a track is compatible with AVC file readers and H.264/AVC decoders.

The syntax on an extractor NAL unit can in some embodiments be:

```
class aligned(8) Extractor ( ) {
    NALUnitHeader( );
    unsigned int(8) track_ref_index;
    signed   int(8) sample_offset;
    unsigned int((lengthSizeMinusOne+1)*8)
        data_offset;
    unsigned int((lengthSizeMinusOne+1)*8)
        data_length;
}
```

The NALUnitHeader( ) in some embodiments formatted identically to that of the video coding NAL units.

The track_ref_index specifies the index of the track reference of type 'scal' to use to find the track from which to extract data. The sample in that track from which data is extracted is temporally aligned or nearest preceding in the media decoding timeline, i.e. using the time-to-sample table only, adjusted by an offset specified by sample_offset with the sample containing the Extractor. The first track reference has the index value 1; the value 0 is reserved.

The sample_offset gives the relative index of the sample in the linked track that shall be used as the source of information. Sample 0 (zero) is the sample with the same, or the closest preceding, decoding time compared to the decoding time of the sample containing the extractor; sample 1 (one) Is the next sample, sample −1 (minus 1) is the previous sample, and so on.

The data_offset is the offset of the first byte within the reference sample to copy. If the extraction starts with the first byte of data in that sample, the offset takes the value 0. The offset shall reference the beginning of a NAL unit length field.

The data_length is the number of bytes to copy. If this field takes the value 0, then the entire single referenced NAL unit is copied (i.e. the length to copy is taken from the length field referenced by the data offset, augmented by the additional_bytes field in the case of Aggregators).

The lengthSizeMinusOne is specified in the sample entry for the track.

In some embodiments, the syntax of the conditional extractor NAL unit comprises a data reference index which refers to a data reference entry in the data reference box, which specifies the file or URL where the enhancement data to be extracted resides. In addition, the conditional extractor NAL unit includes a byte offset relative to the beginning of the file indicated by the data reference index.

For example in some embodiments the syntax of the conditional extractor NAL unit is specified as follows:

```
class aligned(8) ConditionalExtractor ( ) {
  NALUnitHeader( );
  unsigned int(8) data_ref_index;
  unsigned int(64) data_offset;
  unsigned int((lengthSizeMinusOne+1)*8) data_length;
}
```

The data for the enhanced representation are therefore located in a second file. The data need not be encapsulated as samples, but each NAL unit is typically preceded by a syntax element indicating the length of the following NAL unit in bytes. In such embodiments no track has to be specified for the enhanced representation.

The file encapsulator enhancement media data encapsulator 309 can then in some embodiments store the enhancement media data in a second file at the location indicated by the conditional data reference.

The operation of encapsulating in the second file sample data referenced by the conditional data reference the enhanced media data is shown in FIG. 5 by step 507.

In some embodiments the file encapsulator 101 can generate a single metadata file for all versions (for example for various bitrates) of the content/media file.

The metadata of all versions of the content can for example reside in the same file. In some embodiments the same file can for example be partitioned into fragments covering certain playback ranges of the presentation. The media data can in some embodiments reside in the same file or can be located in external file(s) referred to by the metadata.

In some embodiments the file encapsulator 101 can generate a metadata file for each version. The metadata of a single version (bitrate) of the content therefore can reside in the same file, for example the content can be partitioned into fragments covering certain playback ranges of the presentation. The media data can reside in the same file or can be located in external file(s) referred to by the metadata.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, some boxes are mandatorily present in each file, while others are optional. Moreover, for some box types, it is allowed to have more than one box present in a file. It could be concluded that the ISO base media file format specifies a hierarchical structure of boxes.

Figure 6:
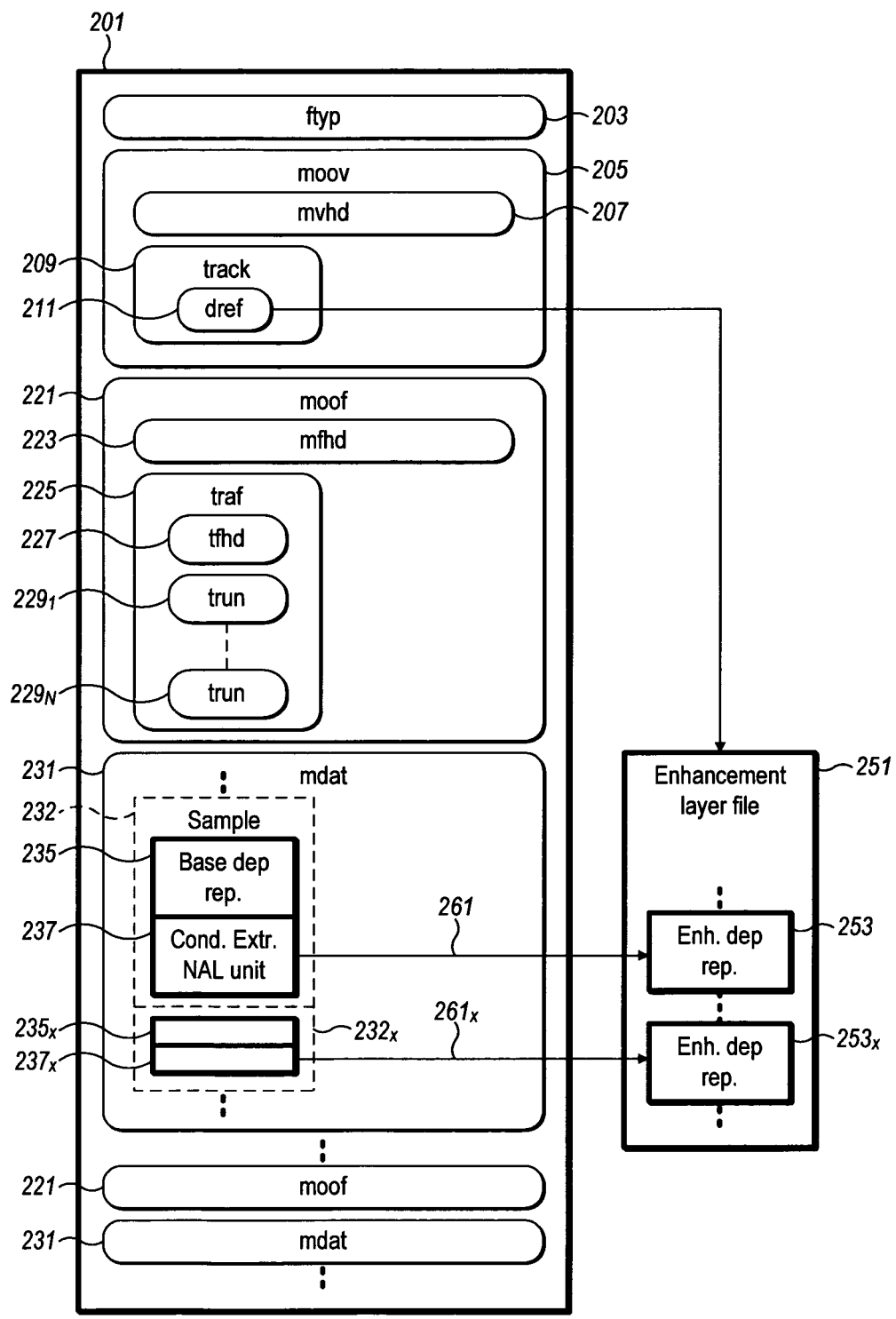
FIG. 6 shows an example file format generated by the file encapsulator according to some embodiments of the application.

With respect to FIG. 6 a simplified file structure according to some embodiments of the application can be shown. According to ISO family of file formats, a file 201 can comprise media data and metadata that are enclosed in separate boxes, the media data (mdat) box 231 and the movie (moov) box 205, respectively.

The movie box (moov) 205 can in some embodiments comprise one or more tracks, and each track resides in one track box. A track can be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may contain guidance for packet header construction and include packet payload construction. Alternatively, a hint track can be a reception hint track, the samples of which represent packets as they have been received over a communication protocol.

In the packet payload construction, data residing in other tracks or items can be referenced. In other words which piece of data in a particular track or item is to be copied into a packet during the packet construction process can be indicated by a reference. A timed metadata track refers to samples describing referred media and/or hint samples. For the presentation one media type, typically one media track is selected.

Samples of a track can be implicitly associated with sample numbers that are incremented by 1 in the indicated decoding order of samples. The first sample in a track can be associated with sample number 1.

It is noted that the ISO base media file format does not limit a presentation to be contained in one file, but it may be contained in several files. One file contains the metadata for the whole presentation. This file may also contain all the media data, whereupon the presentation is self-contained. The other files, if used, are not required to be formatted to ISO base media file format, are used to contain media data, and may also contain unused media data, or other information. The ISO base media file format concerns the structure of the presentation file only. The format of the media-data files is constrained the ISO base media file format or its derivative formats only in that the media-data in the media files must be formatted as specified in the ISO base media file format or its derivative formats.

The ability to refer to external files can in some embodiment be also realized through data references as follows. The sample description box contained in each track includes a list of sample entries, each providing detailed information about the coding type used, and any initialization information needed for that coding. All samples of a chunk and all samples of a track fragment use the same sample entry. A chunk is a contiguous set of samples for one track. The Data Reference box, also included in each track, contains an indexed list of URLs, URNs, and self-references to the file containing the metadata. A sample entry can thus point to one index of the Data Reference box, hence indicating the file containing the samples of the respective chunk or track fragment.

In the example of FIG. 6, the metadata is stored with the base media data in a first file 201 and linked by pointer to the enhancement layer file 251 or files. The metadata is in some embodiments partitioned into fragments covering a certain playback duration. If the file contains tracks that are alternatives to each other, such as the same content coded with different bitrate, FIG. 6 illustrates the case of single metadata file for all versions; otherwise, it can illustrate the case of one metadata file for each version.

The first or base media/metadata file 201 can in some embodiments comprise a file type header (ftyp) 203 indicating the major brand of the file and the compatible brands the file conforms to. Furthermore in some embodiments the base media/metadata file 201 comprises a movie box (moov) 205, which contains information of the movie and the tracks it contains. In particular the movie box 205 can in some embodiments comprise a movie box header (mvhd) 207 and at least one track (track) 209. Each of the tracks furthermore can comprise a data reference box (dref) 211 which declares the location(s) of the media data of the track. In this example, the data reference box includes two references, one to the enhancement layer file 251 as indicated by a solid line and a second dashed line to the base layer data (mdat) 231.

In some embodiments the movie box (moov) 205 can further comprise a Movie Extends box (mvex) which can provide the overall duration, including fragments, of a fragmented movie. The movie extends box (mvex) can furthermore comprise track extends boxes (trex) associated with the track boxes.

In some embodiments as shown in FIG. 6 the base media/metadata file comprises a movie fragment box (moot) 221.

Movie fragments can be employed in some embodiments by the file encapsulator to avoid losing data if a recording application crashes, runs out of disk, or some other incident happens when recording content to ISO files. Without movie fragments, data loss may occur because the file format insists that all metadata (the Movie Box) be written in one contiguous area of the file. Furthermore in some embodiments the file encapsulator can during generation determine there may not be sufficient amount of RAM to buffer a Movie Box for the size of the storage available. Without using movie fragments the file encapsulator would have to perform the time consuming task of closing the Movie and re-compute the contents of a Movie Box.

In some embodiments movie fragments can enable simultaneous recording and playback of a file using a regular ISO file parser. Furthermore in some embodiments the employment of movie fragments can require smaller duration of initial buffering for progressive downloading. In other words simultaneous reception and playback of a file when movie fragments are used and the initial Movie Box is typically smaller when compared to a file with the same media content but structured without movie fragments.

In some embodiments the file encapsulator 101 can be configured to employ movie fragments enabling the moov box metadata to be split into multiple pieces, each corresponding to a certain period of time for a track. In other words, the file encapsulator 101 in some embodiments can interleave file metadata and media data. Consequently, the size of the moov box in such embodiments can be limited.

In some embodiments as described above the file encapsulator 101 can encapsulate the media samples for the movie fragments in an mdat box if they are in the same file as the moov box. In some embodiments a moof box can be provided for the meta data of the movie fragments. The moof box in some embodiments comprises the information for a certain duration of playback time (that can be in the moov box).

In such embodiments the moov box 205 represents a valid movie, but in addition, it comprises an mvex box indicating that movie fragments will follow in the same file. The movie fragments extend the presentation that is associated to the moov box 205 in time.

The metadata that can be included in the moof box is limited to a subset of the metadata that can be included in a moov box and is in some embodiments coded differently to the movie box.

The movie fragment box (moof) 221 in some embodiments comprises a movie fragment header (mfhd) 223 and at least one track fragment box (traf) 225 each of which document a contiguous run of samples for that track. The track fragment box (traf) 225 further comprises a track fragment header box (tfhd) 227 and at least one track fragment run boxes (trun) 229. The track fragment header box (tfhd) 227 indicates the sample description that is used within the track fragment. The sample description indicates the data reference entry used, which in this case can point to the same file that contains the movie box and the movie fragment boxes too. The track fragment header box (tfhd) 227 can in some embodiments further indicate a base byte offset for the sample data of the track fragment, which in some embodiments is within a mdat box following the movie fragment box. The base byte offset and the track run boxes thus in some embodiments indicate the exact location of the samples within the file.

The first or base media/metadata file 201 can in some embodiments comprise a media data box (mdat) 231 which comprises at least one sample 232. Each sample comprises a base media data section (base dep. rep.) 235 and a conditional data reference pointer or pointers implemented as a conditional extraction NAL unit 237. Each conditional extraction NAL unit conditionally points 261 to an associated dependent enhanced media section 253 of an enhancement layer file 251.

As is also shown in FIG. 6 there is a second or enhancement layer file 251 which comprises at least one associated enhanced media section 253 which is referenced by the conditional extraction NAL unit 237 by the pointer 261 and located within the first or base media/metadata file 201.

The file encapsulator 101 can then output the file in a suitable server file format to the HTTP Streaming Server 103. As shown above a suitable server file format is in some embodiments an ISO base media file format or derivative including the data reference feature.

The operation of determination of the file/encapsulation of the file in response to the request is shown in FIG. 2 by step 163.

The server 1 can in some embodiments comprise a HTTP streaming server 103. The HTTP streaming server 103 can in some embodiments be configured to receive one or more files of a media presentation as input. The input files are formatted according to the server file format.

The HTTP streaming server 103 is configured to output the content to be passed to the HTTP streaming client 107 in a transport file format interface 7 such as shown in FIG. 1a. The transport file format in some embodiments can be compliant with an existing file format suitable for file playback. For example in some embodiments the HTTP streaming server is configured to generate files which are compliant with the ISO Base Media File Format or the progressive download profile of the 3GPP file format. The transport file format in some embodiments can be compliant with the server file format, and, consequently, server files can be in some embodiments be transmitted without modifications in the transport file format interface 7 to the HTTP streaming client 107.

In some other embodiments the HTTP streaming server 103 is configured to generate files which are similar to files formatted according to an existing file format used for file playback. For example, in some embodiments the HTTP streaming server 103 is configured to generate files fragments of a server file, which can in some embodiments be not self-containing for playback individually.

In some embodiments the HTTP streaming server 103 can be configured to generate files to be transmitted which are compliant with an existing file format that can be used for file playback, but the files are transmitted only partially and hence playback of such files requires awareness and capability of managing partial files.

In some embodiments the HTTP streaming server can generate files in the transport file format which enables the transmitted files to be converted to comply with an existing file format used for file playback.

For example the HTTP streaming server 103 in some embodiments is configured to output over the network a file conforming to the ISO base media file format or derivative including the conditional data reference feature, when a regular web server without a dynamic streaming server is in use. Furthermore the HTTP streaming server 103 in some embodiments is configured to output over the network a transport file using segments (e.g. as per adaptive HTTP streaming of 3GPP or IIS Smooth Streaming by Microsoft), when a regular web server with a dynamic streaming server is in use.

The HTTP streaming server 103 can therefore in embodiments of the application transmit segments that are formatted according to the above. In other words, the segments can comprise conditional data reference pointers, which refer to such byte offsets that may not be transmitted.

The outputting of the file in a transport file format is shown in FIG. 2 by step 165.

The system 10 in some embodiments can optionally comprise one or more HTTP caches 105. In these embodiments an HTTP cache 105 is a regular web cache that stores HTTP requests and the responses to the HTTP requests to reduce bandwidth usage, server load, and perceived lag. In some embodiments an HTTP cache 105 can determine the previous receipt of a particular HTTP request and the storage of the response to the HTTP request and can then serve the requestor (the HTTP client) with the response rather than forwarding the request to the HTTP streaming server 103.

In some embodiments the client 1 can be configured to receive the responses to the HTTP requests. The HTTP streaming client 107 can in some embodiments be further configured to receive the response data in the form of a suitable Transport file format from the server 1. In some embodiments the data can be received as described above via an HTTP cache 105.

The HTTP streaming client 107 thus in some embodiments is configured to receive the file(s) of the media presentation. The HTTP streaming client 107 is in some embodiments further configured to output one or more of the files to a file player or to some storage means.

In some embodiments as the enhancement media data resides in a second file separate from the first file containing the base media data and file format metadata, two simultaneous TCP connections can be established, one for obtaining the first file and a second one for obtaining the second file. An HTTP GET request without a byte range can be issued for the first file. The HTTP streaming client in some embodiments can estimate whether or not the second file can be received in real-time based on the bitrate and other information located in the movie box of the first file and the reception bitrate of the first file. Information, such as the bitrate, of the second file can also be obtained by other means, such as from the Media Presentation Description (MPD) or the scalability information SEI message.

An HTTP GET request without a byte range may be issued for the second file, if it is estimated that the whole file can be received in real-time. The HTTP streaming client may also determine a subset of the second file that can be received in real-time based on information located in the movie box, such as SVC and MVC sample group descriptions. An HTTP GET request with an appropriate byte range may be issued to get a subset of the second file. The appropriate byte range may be determined based on data reference pointers and track fragment headers among other things. Multiple HTTP GET requests for different byte ranges of the second file may be pipelined. The HTTP streaming client 107 in some embodiments can monitor the reception bitrate and the occupancy of the buffers before and after decoding and re-estimate a subset of the second file that can be received in real-time.

The operation of receiving the file is shown in FIG. 2 by step 171.

In some embodiments the HTTP streaming client 107 is furthermore configured to output the files to the file player or to some storage means as an interchange file format 11. The interchange file format 11 in some embodiments can be for example a transport file format and in some further embodiments can be a file format used for file playback. The interchange file format in some embodiments can be compliant with the server file format, and, consequently, if server files are in some embodiments transmitted without modifications in the transport file format interface 7 to the HTTP streaming client 107, received server files without modifications can be interchange files.

In some embodiments the HTTP streaming client 107 is configured to guess or estimate a suitable buffering time for the files being received and to permit the file player to start the media rendering after this buffering time. In such embodiments the HTTP streaming client 107 need not have created the original request related to bitrate adaptation of the media presentation. In some other embodiments some HTTP streaming client 107 implementations can monitor the buffering status of the presentation in the client and create requests related to bitrate adaptation in order to guarantee rendering of the presentation without interruptions.

Furthermore the client 3 can comprise a file player 109 which is operationally connected to the HTTP streaming client 107. In some embodiments the HTTP streaming client 107 can comprise the file player. The file player 109 in some embodiments is configured to parse the files, decode the media streams and render the decoded media streams. In some embodiments the file player 109 may also store the received file(s) for further use and an interchange file format is used for file storage in such embodiments.

A suitable interchange file format can be for example an ISO base media file format or derivative including the data reference feature, where the currently existing players can play at least the base quality of the content encapsulated into the file without the use of the data reference feature. In some embodiments the HTTP streaming client carries out the conversion to the second type of file.

The HTTP streaming client 107 in some embodiments thus receives the first file (the metadata/base media file) and at least a subset of the second file (the enhancement layer file), where the subset is determined such a manner that media data is received at a pace or bitrate enabling continuous playback without interruptions.

Thus in these embodiments some of the conditional data reference pointers may point to such part of the second file which is not received and hence such data should not be included by reference. The HTTP streaming client 107 operating as a progressive downloading client can furthermore in some circumstances receive only the first file containing only the base media data. However, as the data pointed to by conditional data reference pointers is ignored, the progressive downloading client can play the base media data.

The HTTP streaming client 107 in some embodiments thus can replace the byte ranges of the enhancement media data which are not received with identifier values disabling data inclusion by reference.

The HTTP streaming client 107 and/or file player 109 at the time of parsing processes the data block(s) pointed to by the conditional data reference pointer. The HTTP streaming client 107 and/or file player 109 in such embodiments determines if the data block(s) are not present (i.e., not received due to bitrate adaptation), and where the data blocks referenced are not present ignores the conditional data reference pointer. If the data block(s) are present the HTTP streaming client 107 and/or file player 109 can include by reference into the sample data referenced by the conditional data reference pointer.

The conditional data reference pointer is conditional on the presence of the data it is pointing to differs from other extractor NAL unit or some hint track constructor types. Extractor NAL unit and the hint track constructors using data inclusion by reference are unconditional in other words the data referred to must be present; otherwise, the file is invalid.

The operation of playing of the file is shown in FIG. 2 is shown by step 173.

Figure 7:
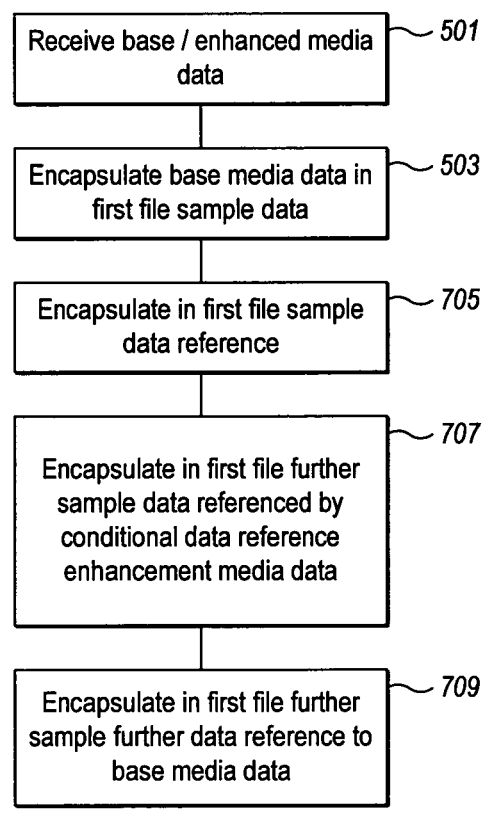
FIG. 7 shows a schematically the operation of the file encapsulator according to some further embodiments of the application.

With respect to FIG. 7 the operation of the file encapsulator 101 according to some further embodiments of the application is shown. These embodiments are particularly applicable to generate file structures where an entire bitstream is included in a single file for presentation to the client. Such a file can be progressively downloaded and can be played without interruptions if the network throughput meets or exceeds the bitrate of the entire bitstream.

Figure 8:
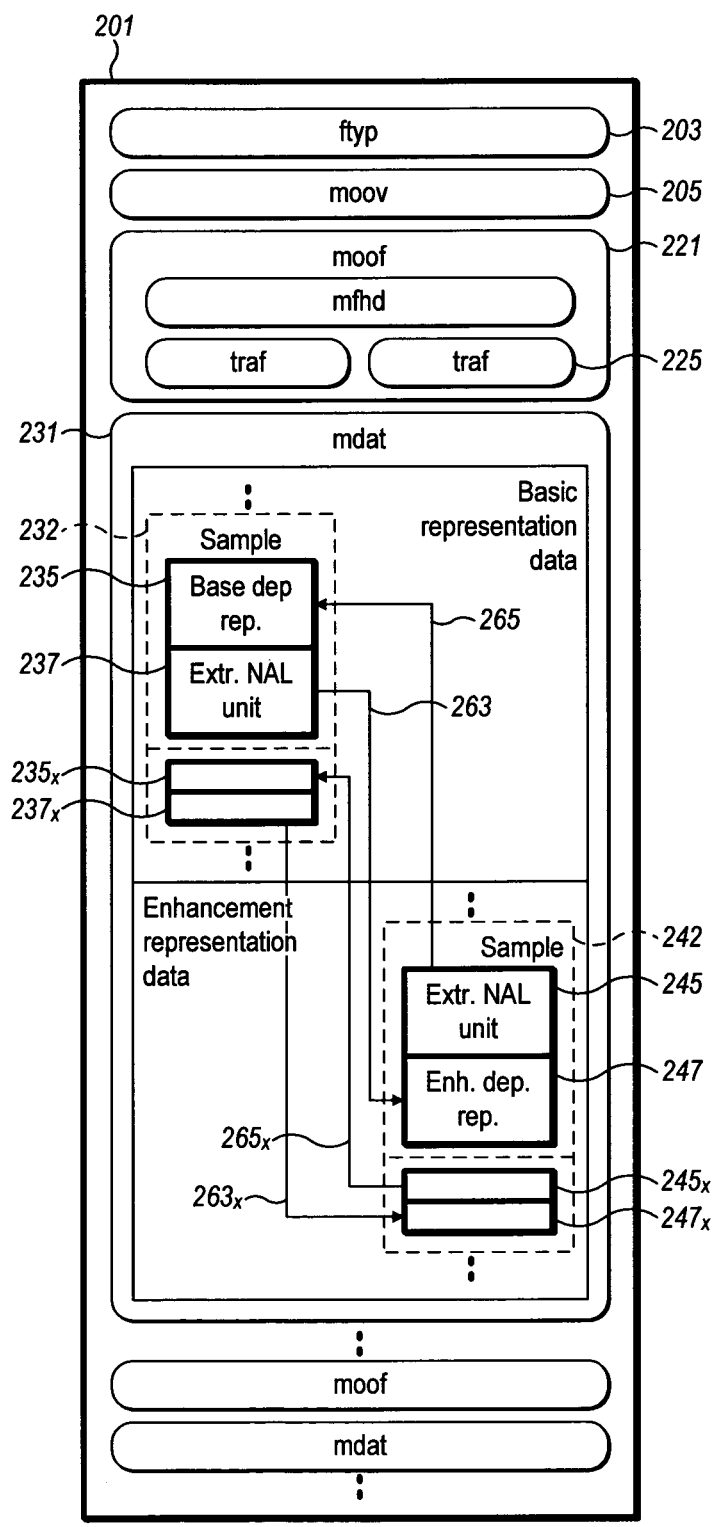
FIG. 8 shows an example file format generated by the file encapsulator according to some further embodiments of the application.

FIG. 8 furthermore illustrates an example file created according to these embodiments of the application. In order to keep the example simple, only one media type is presented in the figure, although typical multimedia presentation can contain more than one continuous media type, such as audio and video can be processed.

The file encapsulator 101 in some embodiments is configured to receive the base and enhanced media data from the file creator 100.

The operation of receiving the base and enhanced media data is shown in FIG. 7 by step 501.

The metadata encapsulator 305 can in some embodiments encapsulate in a first file metadata associated with the media.

Furthermore in some embodiments the base media data encapsulator 307 encapsulates base media data into the first file as a track in the file.

The operation of encapsulating the base media data in the first file sample data is shown in FIG. 7 by step 503

The enhancement media data encapsulator 309 furthermore is configured to generate and encapsulate within the first file sample data a data reference pointer. In some embodiments the data reference pointer can comprise an extractor NAL unit. An extractor NAL unit is configured to provide a way to share data among multiple tracks describing the same scalable or multiview stream and therefore does not enlarge the file excessively. The data reference pointer is coupled to the location of the enhancement media data location described hereafter.

The operation of encapsulating in the first file sample data a data reference is shown in FIG. 7 by step 705.

The file encapsulator enhancement media data encapsulator 309 can then in some embodiments store the enhancement media data in the first file at the location indicted by the data reference pointer.

The operation of encapsulating in the first file further sample data referenced by the data reference the enhanced media data is shown in FIG. 7 by step 707

Furthermore the enhancement media data encapsulator 309 in some embodiments is configured to encapsulate a further data reference pointer in the first file further sample pointing to the associated base media data sample location. In some embodiments the further conditional data reference pointer comprises a further extractor NAL unit.

The operation of encapsulating in the first file further sample data a further data reference is shown in FIG. 7 by step 709. In some embodiments, step 709 of FIG. 7 need not be present or is optional.

The simplified file structure according to these embodiments of the application shown in FIG. 8. According to ISO family of file formats, a file 201 can comprise media data and metadata that are enclosed in separate boxes, the media data (mdat) box 231 and the movie (moov) box 205, respectively. For a file to be operable, both of these boxes must be present.

The movie box (moov) 205 can in some embodiments comprise one or more tracks, and each track resides in one track box.

In this example, no references to samples are made from the movie box. In other words, the movie box contains no sample size box nor a chunk offset box. In this example, two tracks are created for the media bitstream, a base media track and an enhancement media track. The sample description avc1, avc2, svc1, mvc1, or mvc2 can be used in embodiments for the base media track and enhancement media track, as they are recognized by existing parsers.

In some embodiments as shown in FIG. 8 the base media/metadata file comprises a movie fragment box (moof) 221. The movie fragment box (moof) shown in FIG. 8 comprises two track fragment boxes (traf). Each of the track fragment boxes 225 includes a track fragment header box (tfhd) and a number of track fragment run boxes (trun). The track fragment run boxes specify the location of the samples in that track fragment run. In this example, the referred samples are located in the mdat box following the movie fragment. Samples of different tracks are in different track fragment runs. If there are multiple track fragment runs per track within a movie fragment, then track fragment runs of different tracks may be interleaved within the mdat box.

The media/metadata file 201 can in some embodiments comprise a media data box (mdat) 231 which comprises a sample 232 in the base media track representing an SVC or similar access unit and comprises two parts: the base layer dependency representation 235 and an extractor NAL unit 237. The extractor NAL unit 237 in such embodiments points or refers to 263 to the enhancement media track, which includes the NAL units for the enhancement layer(s). A sample 242 in the enhancement media track also represents an SVC access unit and comprises two parts: an extractor NAL unit 245 and the enhancement media data 247, such as dependency representations with dependency_id greater than 0. The extractor NAL unit 245 points or refers to 265 the base layer dependency representation 235 included in the base media track.

In such embodiments a conventional progressive downloading client can receive an entire file and hence, all references made by extractor NAL units are resolved. Furthermore in such embodiments if an adaptive HTTP streaming client stores the received file for later use, the client can in some embodiments replace the sample entry type of enhancement data track by a new sample description, e.g. svcp or mvcp, indicating potentially partial reception of the track and hence incompatibility with earlier parsers. A file parser reading a track marked with sample description svcp, mvcp, or alike should be aware that some samples need not contain coded media data or may be absent, and consequently such a track need not be decodable. If there are multiple alternative tracks, a file parser should not choose a track marked with a sample description svcp, mvcp, or alike for decoding but rather choose a track with a sample description avc1 or alike, where media data is present for all samples.

In some embodiments an adaptive HTTP streaming client adaptively receives or determines not to receive track fragment runs of the enhancement media track. In some embodiments an adaptive HTTP streaming client adaptively receives or determines not to receive subsets of track fragment runs of the enhancement media track. The client therefore in some embodiments can create a conformant file by replacing the extractor NAL units pointing to them by a redundant NAL unit or by replacing the non-received track fragment runs or the non-received subsets of track fragment runs by zero within the reconstructed file, which is interpreted as a sequence of zero-sized NAL units. Therefore in some embodiments when an extractor NAL unit refers to one or more zero-sized NAL units, all of them are ignored by a file parser or alike reading, parsing, decoding, and/or playing the file. The server and the client can typically keep file metadata that concerns byte offsets within the file intact, i.e., the same as in the server file.

In some embodiments a file received by an adaptive HTTP streaming client such a manner that a part of the enhanced media data is missing or patched with zero-sized NAL units or other elements indicating a parser to ignore the elements is complemented by a later data transfer. The later data transfer concerns at least those parts of enhanced media data which are missing or patched in the file. The later data transfer need not happen before the first decoding and playback of the file.

Furthermore in some embodiments the server format files may be arranged where one or more representations are formed based on the same scalable media stream. Such server format files enable different subsets of the enhancement media data to be transmitted. Segment duration in some embodiments can be determined by each pair of a Movie Fragment box and the subsequent mdat box. A segment is formed by the Movie Fragment box and a subset of the subsequent mdat box, where the subset differs for different representations. The file encapsulator as shown above can be configured to arrange the media data in each mdat box in a layered manner, such that the base media data appears first followed by the enhancement media data, potentially further followed by a further enhancement media data and so on.

In some embodiments a manifest file, such as an MPD file, is created to indicate the characteristics of each representation. The HTTP streaming server in such embodiments converts the URL of a segment (as allowed by the MPD file) to a byte range containing the respective Movie Fragment box and a subset of the subsequent mdat box.

The HTTP streaming client then and/or the file player in such embodiments is configured to resolve the conditional data reference pointers similarly to other embodiments of the application, in other words where the data referred to by a data reference pointer is not received, the data reference pointer is ignored.

In some embodiments an indication of how to convert segments of the transmission file format into an interchange file can be included in the manifest file, such as an MPD file. In some embodiments of the application the indication can be set to a value indicating that the following process can be used to create an interchange file. The mdat box of a segment can be received incompletely and the Track Fragment Run boxes of a segment may refer to such byte offsets within the mdat box that are not received. The mdat box in such embodiments can be first patched by writing a pre-defined value for the non-received byte offsets of the mdat box. The pre-defined value indicates that media data is not present. For AVC, SVC, and MVC tracks, the default value is 0, which is interpreted as zero-sized NAL units. The segments with patched mdat boxes are then concatenated to form an interchange file.

The following table presents the semantics of Media Presentation Description as specified in Table 2 of clause 12.2.5.2 of 3GPP TS 26.234 v9.2.0, further comprising file reconstruction fields according to embodiments indicated with underlined type. Notation: M=Mandatory, O=Optional, OD=Optional with Default Value, CM=Conditionally Mandatory

| Element or Attribute Name | Type (Attribute or Element) | Cardinality | Optionality | Description |
| --- | --- | --- | --- | --- |
| MPD | E | 1 | M | The root element that carries the Media Presentation Description for a presentation. |
| type | A | | OD default: OnDemand | "OnDemand" or "Live". Indicates the type of the presentation. Currently, on-demand and live types are defined. If not present, the type of the presentation shall be inferred as OnDemand. |

-continued

| Element or Attribute Name | Type (Attribute or Element) | Cardinality | Optionality | Description |
|---|---|---|---|---|
| availabilityStartTime | A | | CM Must be present for type = "Live" | Gives the availability time (in UTC format) of the start of the first period's Representation. |
| availabilityEndTime | A | | O | Gives the availability end time (in UTC format). After this time, the segments described in this MPD are no more accessible. When not present, the value is unknown. |
| duration | A | | O | Indicates the duration of the media presentation. When the attribute is not present, the duration of the presentation is unknown. |
| minimumUpdatePeriodMPD | A | | O | Provides a minimum MPD update period. |
| minBufferTime | A | | M | Provides the minimum buffer time for the stream in ms. |
| timeShiftBufferDepth | A | | O | Indicates the duration of the time shifting buffer that is maintained at the server for a live presentation. When not present, the value is unknown. |
| baseURL | A | | O | Base URL on MPD level |
| ProgramInformation | E | 0, 1 | O | Provides descriptive information about the program |
| moreInformationURL | A | | O | this attribute contains an absolute URL which provides more information about the program |
| Title | E | 0, 1 | O | the body text of the element contains the program title |
| Source | E | 0, 1 | O | the body text of the element contains the program source |
| Copyright | E | 0, 1 | O | the body text of the element contains the program copyright statement |
| Period | E | 1 . . . N | M | Provides the information of each period |
| start | A | | M | Provides the accurate presentation start time relative to the availabilityStart time of the Media Presentation. |
| segmentAlignmentFlag | A | | O Default: False | When True, indicates that all start and end times of media components of a particular media type in segments across representations in the period are temporally aligned. |
| bitstreamSwitchingFlag | A | | O Default: False | When True, indicates that time sequential segments within a period from 2 different representations may be spliced on a bitstream level while resulting in a valid segment. |
| FileReconstructionInfo | E | 0 . . . N | O | Provides information on how to concatenate segments to form a valid 3GP file. |
| representationReference | A | 0 . . . N | O | Provides a list of representations whose segments can be concatenated in any order to form a valid 3GP file. If representationReference is absent, segments of any representations can be concatenated to a valid 3GP file. |
| concatenationType | A | 1 | M | If 0, the segments are concatenated without modifications into a single 3GP file. If 1, the mdat box of a segment may be received incompletely and the Track Fragment Run boxes of a segment may refer to such byte offsets within the mdat box that are not received. The mdat box is first patched by writing a default value for the non-received byte offsets of the mdat box. For AVC, SVC, and MVC tracks, the default value is 0, The segments with patched mdat boxes are then concatenated to form a 3GP file. Other values of concatenationType are reserved. |
| SegmentInfoDefault | E | 0, 1 | O | Provides default segment information about segment durations and, optionally, URL construction. |
| duration | A | | O | Default duration of media segments |
| baseURL | A | | O | Base URL on period level |

-continued

| Element or Attribute Name | Type (Attribute or Element) | Cardinality | Optionality | Description |
|---|---|---|---|---|
| UrlTemplate | E | 0, 1 | O | UrlTemplate on Period level. For syntax see below. |
| Representation | E | 1 . . . N | M | This element contains a description of a representation. |
| bandwidth | A | | M | Gives the maximum bitrate of the representation averaged over any interval of minBufferTime duration, in bits per second. |
| width | A | | O | Specifies the horizontal resolution of the video media type in an alternative representation, counted in pixels. |
| height | A | | O | Specifies the vertical resolution of the video media type in an alternative representation, counted in pixels. |
| lang | A | | O | Declares the language code(s) for this media according to RFC 5646 [r3]. |
| mimeType | A | | M | Gives the MIME type of the first segment in the representation. Note: this MIME type includes the codecs parameter including the profile and level information where applicable. For 3GP files, the MIME type is provided according to RFC 4281 [107]. |
| startWithRAP | A | | OD Default: False | When True, indicates that all segments in the representation start with a random access point |
| qualityRanking | A | | O | Provides a quality ranking of the representation. Lower values represent higher quality content. If not present then the ranking is undefined. |
| ContentProtection | E | 0, 1 | O | This element provides information about the use of content protection for the segments of this representation. When not present the content is not encrypted or DRM protected. |
| SchemeInformation | E | 0, 1 | O | This element gives the information about the used content protection scheme. The element can be extended to provide more scheme specific information. |
| schemeIdUrl | A | | O | Provides an absolute URL to identify the scheme. The definition of this element is specific to the scheme employed for content protection. |
| TrickMode | E | 0 . . . 1 | O | provides the information for trick mode. It also indicates that the representation may be used as a trick mode representation. |
| AlternatePlayoutRate | E | 0 . . . N | O | Specifies the playout speed as a multiple of the regular playout speed, which this representation supports with the same decoder profile and level requirements as the normal playout rate. |
| SegmentInfo | E | 0, 1 | CM Must be present in case SegmentInfo is not present on higher levels | Provides the time to segment URL map. This element, if present, overrides the defaults provided at higher levels. |
| duration | A | | CM Must be present in case duration is not present on a higher level. | If present, gives the constant approximate segment duration. All segments within this segmentInfo have the same duration unless it is the last segment within the period which could be shorter. |
| InitialisationSegmentURL | E | 0, 1 | O | This element references the initialisation Segment. If not present each media segment is self-contained. |
| sourceURL | A | | M | The source string providing the URL |
| range | A | | O | the byte range |
| UrlTemplate | E | 0, 1 | CM Must be present if the Url element is not present. | If present, specifies a default segment URL template for all segments of all representations, within this segmentInfo. |

-continued

| Element or Attribute Name | Type (Attribute or Element) | Cardinality | Optionality | Description |
|---|---|---|---|---|
| sourceURL | A | | O | The source string providing the template |
| Id | A | | CM (If using URL Template on Period level) | An attribute containing a unique ID for this specific representation within the representation. |
| startIndex | A | | OD default: 1 | The index of the first media segment described by this MPD in this representation. |
| endIndex | A | | OD default: infinite | The index of the last media segment described by this MPD in this representation. |
| startTime | A | | OD default: 0 | The start time of the media segment with index StartIndex. |
| Url | E | 0, N | CM Must be present if the UrlTemplate element is not present. | Provides a set of explicit URL(s) for segments. Note: The URL element may contain a byte range |
| sourceURL | A | | M | The source string providing the URL |
| range | A | | O | the byte range |

In such embodiments where the enhancement media data resides in the same file as the base media data and the file format metadata, one or two TCP connections can typically be established between the HTTP server and client. In some embodiments where two TCP connections are used, one TCP connection is typically used to download the base media data and file format metadata, whereas the other TCP connection is typically used to download the enhancement media data. Pipelined HTTP GET requests with byte ranges are typically used in both TCP connections. Both the subset of the enhancement media data that can be received in real-time is estimated and HTTP GET requests are issued similarly to as described above.

Where in some embodiments one TCP connection is used, the subset of the enhancement media data that can be received in real-time is estimated as described previously. Pipelined HTTP GET requests are issued to obtain file format metadata, base media data, and enhancement media data. A single HTTP GET request may span over one or more type of data: file format metadata, base media data, or enhancement media data. The number of pipelined HTTP GET requests is typically kept moderate in order to avoid the termination of the TCP connection when a change in the transmitted media bitrate (and hence in the byte ranges to be requested) is desired.

Figure 9:
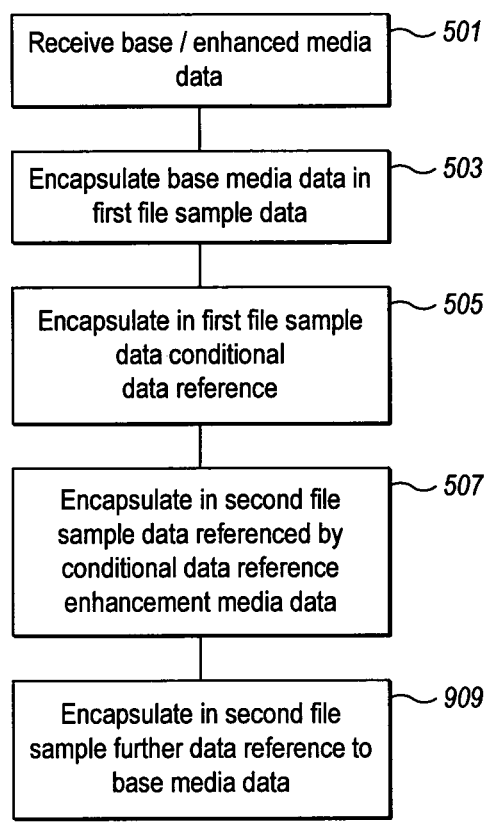
FIG. 9 shows a schematically the operation of the file encapsulator according to some additional embodiments of the application.

With respect to FIG. 9 the operation of the file encapsulator 101 according to some additional embodiments of the application is shown.

Figure 10:
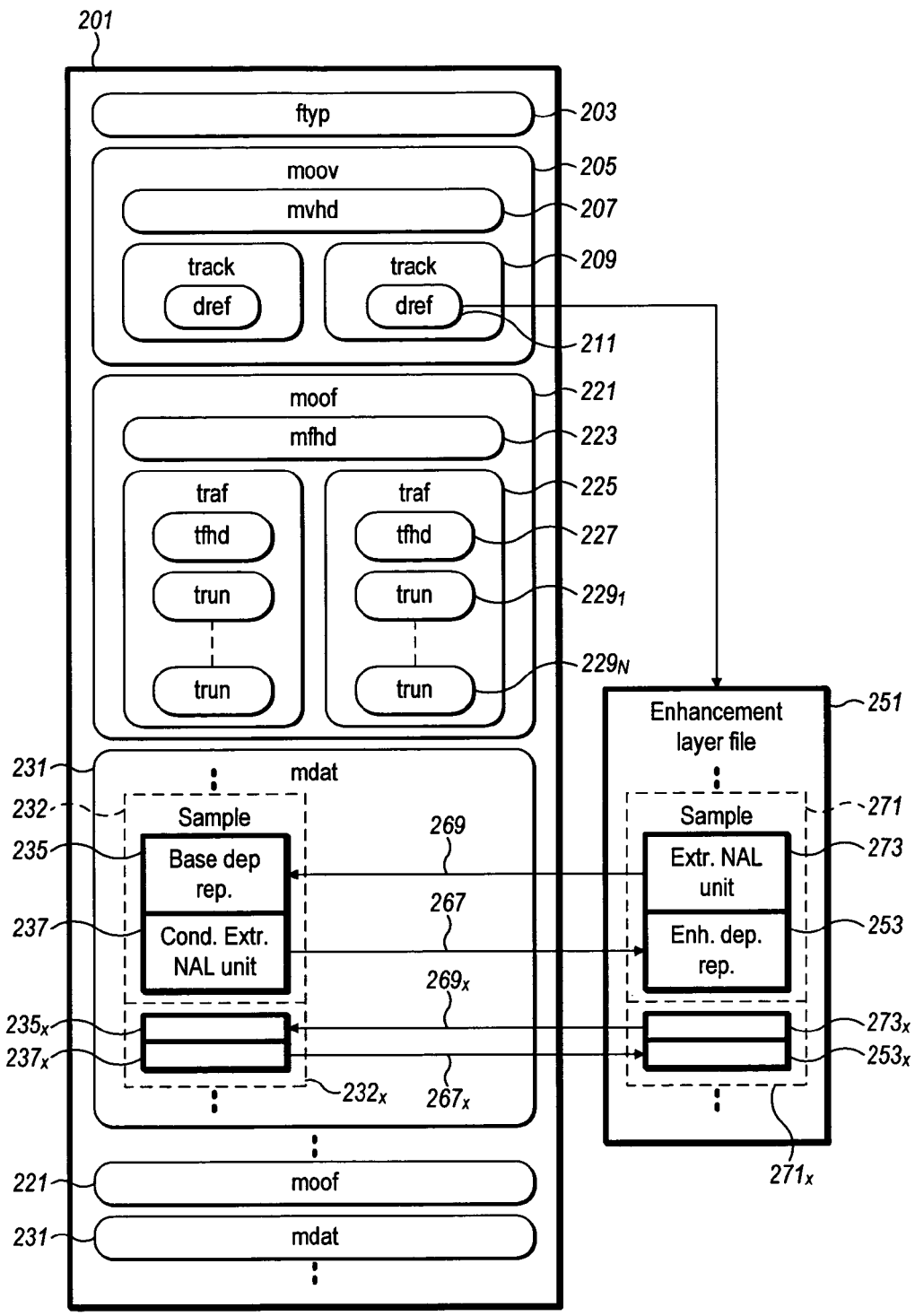
FIG. 10 shows an example file format generated by the file encapsulator according to some additional embodiments of the application.

FIG. 10 illustrates an example file created according to these additional embodiments of the application. In order to keep the example simple, only one media type is presented in the figure, although typical multimedia presentation contain more than one continuous media type, such as audio and video can be created.

The file encapsulator 101 in some embodiments is configured to receive the base and enhanced media data from the file creator 100.

The operation of receiving the base and enhanced media data is shown in FIG. 9 by step 501.

The metadata encapsulator 305 can in some embodiments encapsulate in a first file metadata associated with the media.

Furthermore in some embodiments the base media data encapsulator 307 encapsulates base media data into the first file as a track in the file.

The operation of encapsulating the base media data in the first file sample data is shown in FIG. 9 by step 503.

The enhancement media data encapsulator 309 furthermore is configured to generate and encapsulate within the first file sample data a conditional data reference pointer. In some embodiments the conditional data reference pointer can comprise the syntax of the conditional extractor NAL unit specified similarly to the syntax of the extractor NAL unit. There are at least two tracks for the same bitstream, one track including the basic representation of the bitstream, such as the base layer or the base view, and another track including an enhanced representation of the bitstream or the entire bitstream.

Enhancement data from the track of the enhanced representation is conditionally extracted to be included in the basic representation. In other words, samples of the basic representation include conditional extractor NAL units that refer to the track including the enhanced representation.

The alignment of samples in the conditional extractor NAL unit in some embodiments is done on decoding time, i.e. using the time-to-sample table and the information on track fragment headers only, followed by a counted offset in sample number.

In some embodiments the syntax of the conditional extractor NAL unit is specified as follows:

```
class aligned(8) ConditionalExtractor ( ) {
  NALUnitHeader( );
  unsigned int(8) track_ref_index;
  signed   int(8) sample_offset;
  unsigned int((lengthSizeMinusOne+1)*8) data_offset;
  unsigned int((lengthSizeMinusOne+1)*8) data_length;
}
```

The semantics of the syntax elements are identical to the semantics of the respective syntax elements of the extractor NAL unit.

The samples for the enhanced representation are in some embodiments located in a second file in a manner similar to FIG. 6. The track metadata for the enhanced representation is located in the same file as the movie box and track fragment boxes of the representation shown in FIG. 6.

A sample of the enhanced representation typically includes the base dependency representation or base view by reference into the sample using one or more extractor NAL units.

The operation of encapsulating in the first file sample data a conditional data reference is shown in FIG. 9 by step 505.

The file encapsulator enhancement media data encapsulator 309 can then in some embodiments store the enhancement media data in the second file at the location indicted by the conditional data reference pointer.

The operation of encapsulating in the second file further sample data referenced by the conditional data reference the enhanced media data is shown in FIG. 9 by step 507

Furthermore the enhancement media data encapsulator 309 in these embodiments is configured to encapsulate a data reference pointer in the first file further sample pointing to the associated base media data sample location. In some embodiments the data reference pointer comprises an extractor NAL unit.

The operation of encapsulating in the first file further sample data a data reference is shown in FIG. 9 by step 909.

The simplified file structure according to these embodiments of the application shown in FIG. 10. The file structure as shown in FIG. 10 differs from the file structure shown in FIG. 6 in that each sample 271 in the enhancement layer file 251 comprises the enhanced media data representation 253 which is pointed 267 from the conditional data reference 237 and further comprises an extraction NAL unit 273 pointing 269 to the base media data 235.

Figure 11:
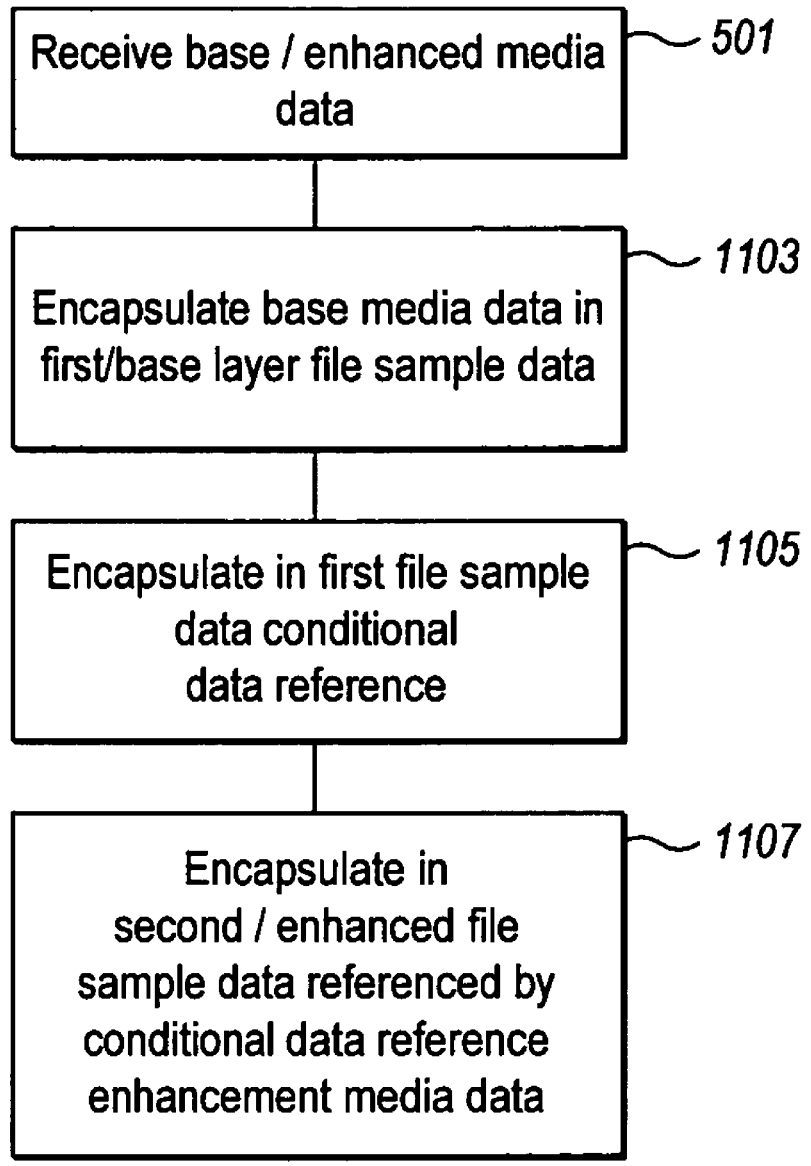
FIG. 11 shows a schematically the operation of the file encapsulator according to some supplementary embodiments of the application.

With respect to FIG. 11 the operation of the file encapsulator 101 according to some additional embodiments of the application is shown.

Figure 12:
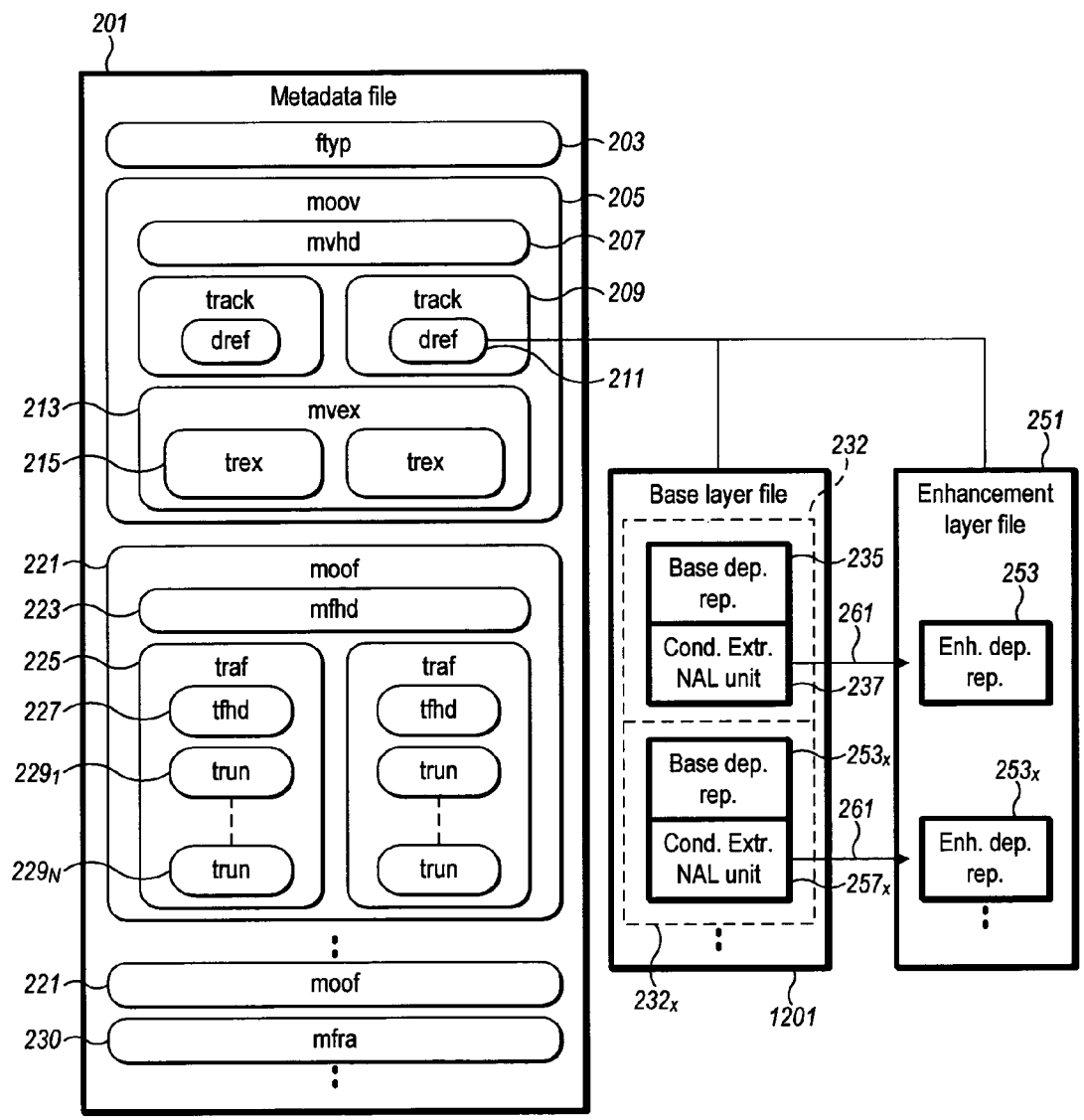
FIG. 12 shows an example file format generated by the file encapsulator according to some supplementary embodiments of the application.

FIG. 12 illustrates an example file created according to these additional embodiments of the application. In order to keep the example simple, only one media type is presented in the figure, although typical multimedia presentation contain more than one continuous media type, such as audio and video can be created.

The file encapsulator 101 in some embodiments is configured to receive the base and enhanced media data from the file creator 100.

The operation of receiving the base and enhanced media data is shown in FIG. 11 by step 501.

The base media data encapsulator 307 encapsulates base media data into the first file (base layer file) as a track in the file.

The operation of encapsulating the base media data in the first file sample data is shown in FIG. 11 by step 1103.

The enhancement media data encapsulator 309 furthermore is configured to generate and encapsulate within the first file sample data a conditional data reference pointer. In some embodiments the conditional data reference pointer can comprise the syntax of the conditional extractor NAL unit specified similarly to the syntax of the extractor NAL unit.

The operation of encapsulating in the first file sample data a conditional data reference is shown in FIG. 11 by step 1105.

The file encapsulator enhancement media data encapsulator 309 can then in some embodiments store the enhancement media data in a second file (enhancement layer file or enhanced layer file) at the location indicted by the conditional data reference pointer.

The operation of encapsulating in the second file further sample data referenced by the conditional data reference the enhanced media data is shown in FIG. 11 by step 1107.

The metadata encapsulator 305 can in some embodiments encapsulate in a metadata file metadata including dref fields indicating the location of the associated base layer and enhanced layer files.

The simplified file structure according to these embodiments of the application shown in FIG. 12. The file structure as shown in FIG. 10 differs from the file structure shown in FIG. 6 in that each sample in the base layer is now located in the base layer file separate from the metadata file.

In some embodiments the sample data of the enhancement media track need not represent a decodable sample even though it is formatted similarly to a decodable sample, such as pairs of a length field and a NAL unit in AVC/SVC/MVC. In other words, the base media data need not be included by reference into the samples. In such embodiments some storage space and transmission bandwidth can be saved, when base media data is not included by reference into the samples of the enhancement media track. The sample description type of such a non-decodable track may differ from the existing sample description types.

These embodiments are applicable to other media types than video. For example, the invention is applicable to audio, such as MPEG-4 Advanced Audio Coding (AAC) and its extensions. Different typed of scalability can be applied in audio coding and used together with the invention, such as number of channels, bandwidth extension, and quality scalability.

The embodiments are further applicable to file structures where the reconstruction of an access unit is done implicitly rather than explicitly using data reference pointers, such as extractor NAL units. In implicit access unit reconstruction, information on the track dependencies may be used to determine the order on which sample data from different tracks is placed in an access unit. For example, track reference 'dpnd' is used to indicate the dependencies between MPEG-4 audio track. If the track type is an MP4AudioEnhancementSampleEntry, then 'dpnd' track-reference is mandatory and indicates a strong dependency, i.e. the track containing the reference cannot be decoded without the referenced track. Other information may also be used to determine the order on which sample data is placed in an access unit. In the MVC file format, it is allowed to indicate whether access unit need to be explicitly or implicitly reconstructed by the explicit_au_track flag of the decoder configuration record of the sample description. If implicit access unit reconstruction is used with MVC, the NAL units have to be ordered in an order allowed in the MVC specification. When the invention is used with file structures where the reconstruction of an access unit is done implicitly, the samples in the enhancement media tracks which are not received may be replaced with an element indicating that no enhancement media data for these samples is present and thus must be ignored in the implicit access unit reconstruction. For example, in MVC, value 0 can be used to indicated zero-length samples.

The embodiments of the application are further applicable for file structures where there is more than one bitstream subset containing enhancement media data. For example, each dependency_id value of an SVC bitstream may be dedicated its own bitstream subset of enhancement media data.

It shall be appreciated that the term user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments of the server 1 and/or the client 3 may be an apparatus comprising at least one processor and at least one memory including computer program code the at least one memory and the computer program code configured to perform the operations of one or more of the FIGS. 2, 4, 5, 7, 9, 11, and/or alike.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments of the server 1 and/or the client 3 may be a computer-readable medium encoded with instructions that, when executed by a computer perform the operations of one or more of the FIGS. 2, 4, 5, 7, 9, 11, and/or alike.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules.

Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
 (a) hardware-only circuit implementations (such as implementations in only analog and/or digital circuitry) and
 (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
 (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
 generating, with a processor, a video coding signal comprising a base layer video signal and an enhanced layer video signal, wherein the enhanced layer video signal enhances a quality of the base layer video signal, wherein the base layer video signal is configured to be decodable independent of the enhanced layer video signal, and wherein the base layer video signal comprises network abstraction layer (NAL) units;
 storing the base layer video signal in a first file;
 generating, with the processor, in the first file a reference pointer to a location, wherein the reference pointer comprises an extractor NAL unit; and
 storing at the location indicated by the reference pointer the enhanced layer video signal, wherein the reference pointer is encapsulated within sample data of the base layer video signal so that the sample comprises a base layer media data section and the extractor NAL unit.

2. The method as claimed in claim 1, wherein the enhanced layer video signal is at least one of:
 a temporal resolution enhanced media representation;
 a greater number of views enhanced media representation;
 a spatial resolution enhanced media representation; and
 a quality enhanced media representation.

3. The method as claimed in claim 1, wherein the location is a location in the first file.

4. The method as claimed in claim 1, further comprising generating at the location indicated by the reference pointer a further reference pointer to the base layer video signal in the first file wherein the further reference pointer comprises an extractor NAL unit.

5. The method as claimed in claim 1, further comprising storing in the first file metadata associated with the base layer video signal and the enhanced layer video signal.

6. The method as claimed in claim 1, further comprising:
generating a patching indicator configured to indicate to a decoder to concatenate the base layer video signal and the enhanced layer video signal.

7. A method comprising:
receiving at least a first file comprising a base layer video signal and a reference pointer to a location, wherein the base layer video signal comprises network abstraction layer (NAL) units and wherein the reference pointer comprises an extractor NAL unit;
determining, with a processor that the content of the location comprises an enhanced layer video signal, wherein the enhanced layer video signal enhances the quality of the base layer video signal; and
decoding, with the processor, the base layer video signal and enhanced layer video signal, wherein the reference pointer is encapsulated within sample data of the base layer video signal so that the sample comprises a base layer media data section and the extractor NAL unit.

8. The method as claimed in claim 7, wherein the enhanced layer video signal is at least one of:
a temporal resolution enhanced media representation;
a greater number of views enhanced media representation;
a spatial resolution enhanced media representation; and
a quality enhanced media representation.

9. The method as claimed in claim 7, wherein the location is a location in the first file.

10. The method as claimed in claim 7, further comprising determining at the location indicated by the reference pointer a further reference pointer to the base layer video signal in the first file, wherein the further reference pointer comprises an extractor NAL unit.

11. The method as claimed in claim 7, further comprising determining in the first file metadata associated with at least the base layer video signal.

12. An apparatus comprising at least one processor and at least one memory including computer program code the at least one memory and the computer program code configured to, with the at least one processor, cause the apparatus at least to:
generate a video coding signal comprising a base layer video signal and an enhanced layer video signal, wherein the enhanced layer video signal enhances a quality of the base layer video signal, wherein the base layer video signal is configured to be decodable independent of the enhanced layer video signal, and wherein the base layer video signal comprises network abstraction layer (NAL) units;
store the base layer video signal in a first file;
generate in the first file a reference pointer to a location, wherein the reference pointer comprises an extractor NAL unit; and
store at the location indicated by the reference pointer the enhanced layer video signal, wherein the reference pointer is encapsulated within sample data of the base layer video signal so that the sample comprises a base layer media data section and the extractor NAL unit.

13. The apparatus as claimed in claim 12, wherein the enhanced layer video signal is at least one of:
a temporal resolution enhanced media representation;
a greater number of views enhanced media representation;
a spatial resolution enhanced media representation; and
a quality enhanced media representation.

14. The apparatus as claimed in claim 12, wherein the location is a location in the first file.

15. The apparatus as claimed in claim 12, further caused to generate at the location indicated by the reference pointer a further reference pointer to the base layer video signal in the first file, wherein the further reference pointer comprises an extractor NAL unit.

16. The apparatus as claimed in claim 12, further caused to store in the first file metadata associated with the base layer video signal and the enhanced layer video signal.

17. The apparatus as claimed in claim 12, further caused to:
generate a patching indicator configured to indicate to a decoder to concatenate the base layer video signal and the enhanced layer video signal.

18. An apparatus comprising at least one processor and at least one memory including computer program code the at least one memory and the computer program code configured to, with the at least one processor, cause the apparatus at least to:
receive at least a first file comprising a base layer video signal and a reference pointer to a location, wherein the base layer video signal comprises network abstraction layer (NAL) units and wherein the reference pointer comprises an extractor NAL unit;
determine that content of the location comprises an enhanced layer video signal, wherein the enhanced layer video signal enhances the quality of the base layer video signal; and
decode the base layer video signal and enhanced layer video signal, wherein the reference pointer is encapsulated within sample data of the base layer video signal so that the sample comprises a base layer media data section and the extractor NAL unit.

19. The apparatus as claimed in claim 18, wherein the enhanced layer video signal is at least one of:
a temporal resolution enhanced media representation;
a greater number of views enhanced media representation;
a spatial resolution enhanced media representation; and
a quality enhanced media representation.

20. The apparatus as claimed in claim 18, wherein the location is a location in the first file.

21. The apparatus as claimed in claim 18, further caused to determine at the location indicated by the reference pointer a further reference pointer to the base layer video signal in the first file, wherein the further reference pointer comprises an extractor NAL unit.

22. The apparatus as claimed in claim 18, further caused to determine in the first file metadata associated with at least the base layer video signal.

* * * * *

UNITED STATES PATENT AND TRADEMARK OFFICE
CERTIFICATE OF CORRECTION

PATENT NO. : 9,769,230 B2  
APPLICATION NO. : 13/810876  
DATED : September 19, 2017  
INVENTOR(S) : Miska Matias Hannuksela Page 1 of 1

It is certified that error appears in the above-identified patent and that said Letters Patent is hereby corrected as shown below:

In the Claims

Column 43,  
Line 17, "that the" should read --that--.  
Line 43, "code" should read --code,--.

Column 44,  
Line 26, "code" should read --code,--.

Signed and Sealed this  
Tenth Day of April, 2018

Andrei Iancu  
*Director of the United States Patent and Trademark Office*